United States Patent [19]

Hill et al.

[11] 4,292,475
[45] Sep. 29, 1981

[54] EXPANDABLE LINK TELEPHONE INTERCOM SYSTEM

[75] Inventors: Stephen R. Hill, Seattle; Victor M. De Pinto, Bellevue; John D. Gillen, Woodinville, all of Wash.

[73] Assignee: Tone Commanders Systems, Inc., Redmond, Wash.

[21] Appl. No.: 70,403

[22] Filed: Aug. 28, 1979

[51] Int. Cl.³ .............................................. H04M 9/00
[52] U.S. Cl. .............................. 179/99 A; 179/18 AB; 179/18 BA
[58] Field of Search ............... 179/99 A, 99 R, 37–40, 179/1 H, 18 AD, 18 AB; 370/62

[56] References Cited

U.S. PATENT DOCUMENTS

| | | | |
|---|---|---|---|
| 3,443,034 | 5/1969 | Schonemeyer et al. | 179/18 AB |
| 4,135,063 | 1/1979 | Bosen | 179/99 A |
| 4,136,263 | 1/1979 | Williams | 179/18 AD |
| 4,188,511 | 2/1980 | Smith et al. | 179/99 A |

Primary Examiner—Gerald L. Brigance
Attorney, Agent, or Firm—Seed, Berry, Vernon & Baynham

[57] ABSTRACT

A multi-link intercom system having a large number of stations selectively connected to one of eight links by respective station controllers. When a calling station goes off-hook, its station controller connects the station to the first available link during the one of four link access periods corresponding to that link. The calling station then applies appropriate signals to the link identifying the called station. These signals are decoded by a link controller for the link which generates called station address signals during its corresponding link access period. All of the link controllers generate called station address signals on the same bus, but the signals are time multiplexed to occur during a portion of each link access period corresponding to each link. The station controller for the called station recognizes its address and connects its station to the link corresponding to the portion of the link access period in which the station address was received. Two-way communication between the calling and called station is then effected. Each of the station controllers utilizes a pair of self-contained controller circuits which are inherently adapted to operate with four link access periods and selectively connect its station to one of four audio links. The system includes circuitry for allowing two of the four-cycle, four-link controller circuits to operate in parallel utilizing relatively few additional signal lines as compared to a four-link system.

7 Claims, 30 Drawing Figures

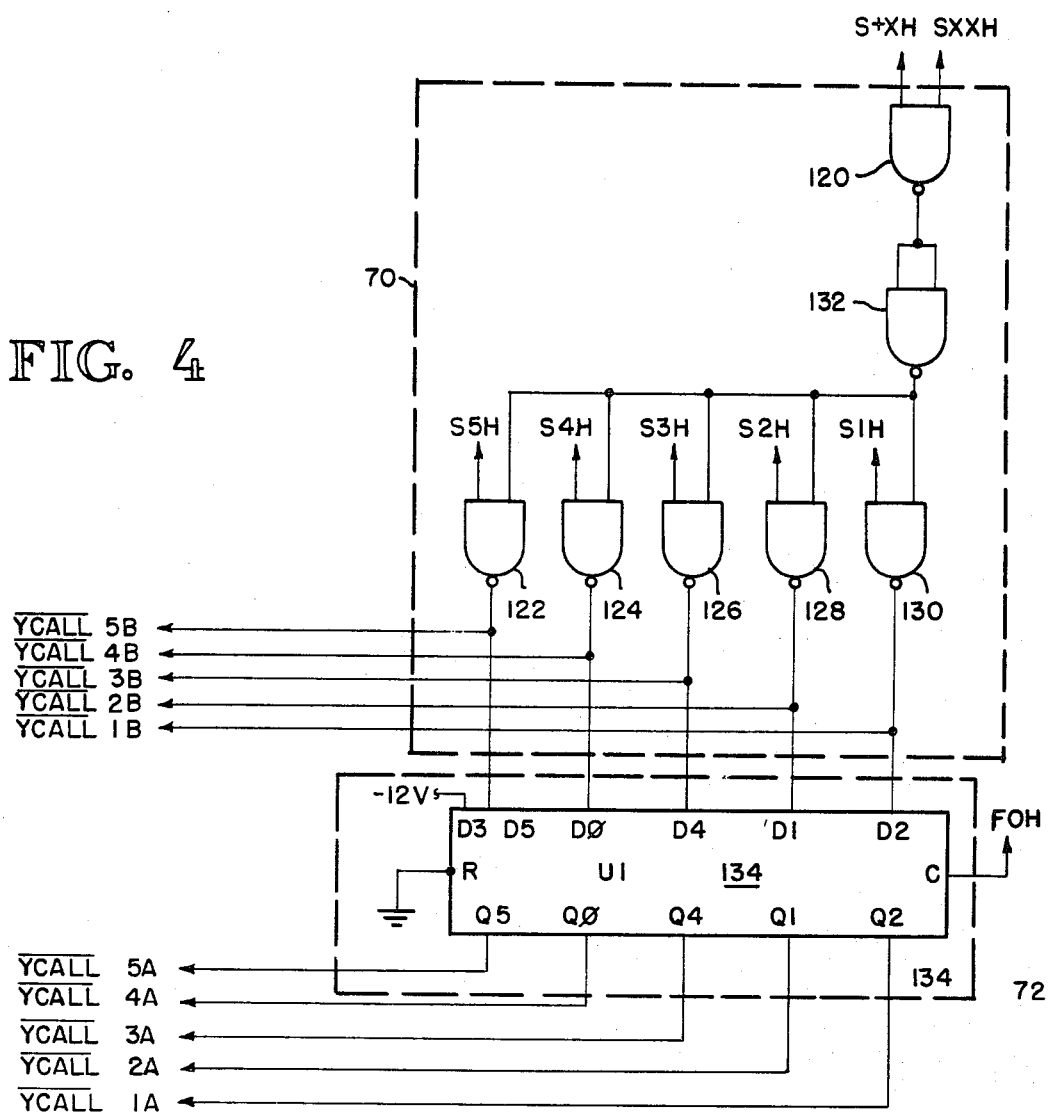

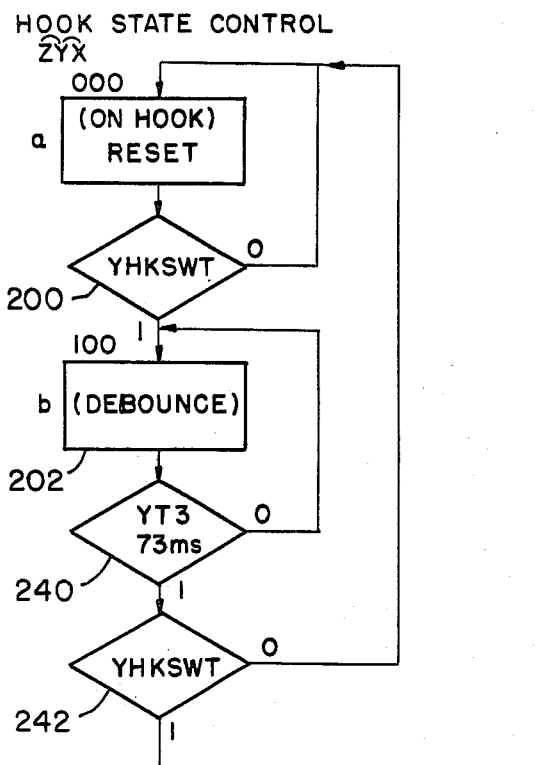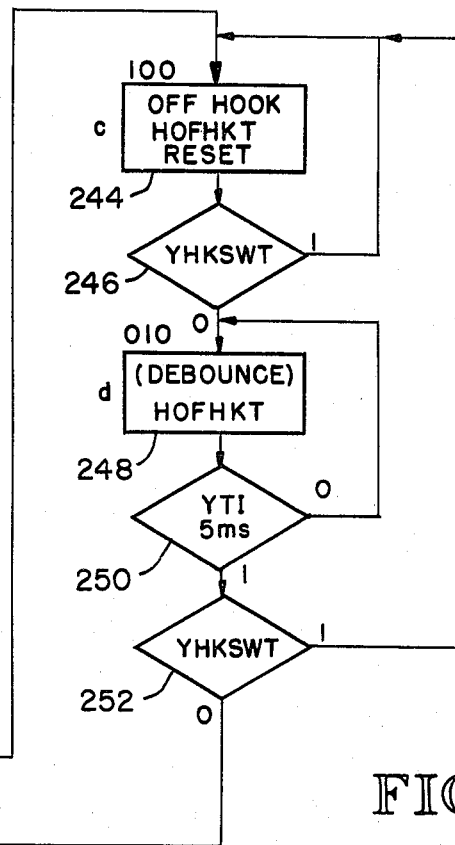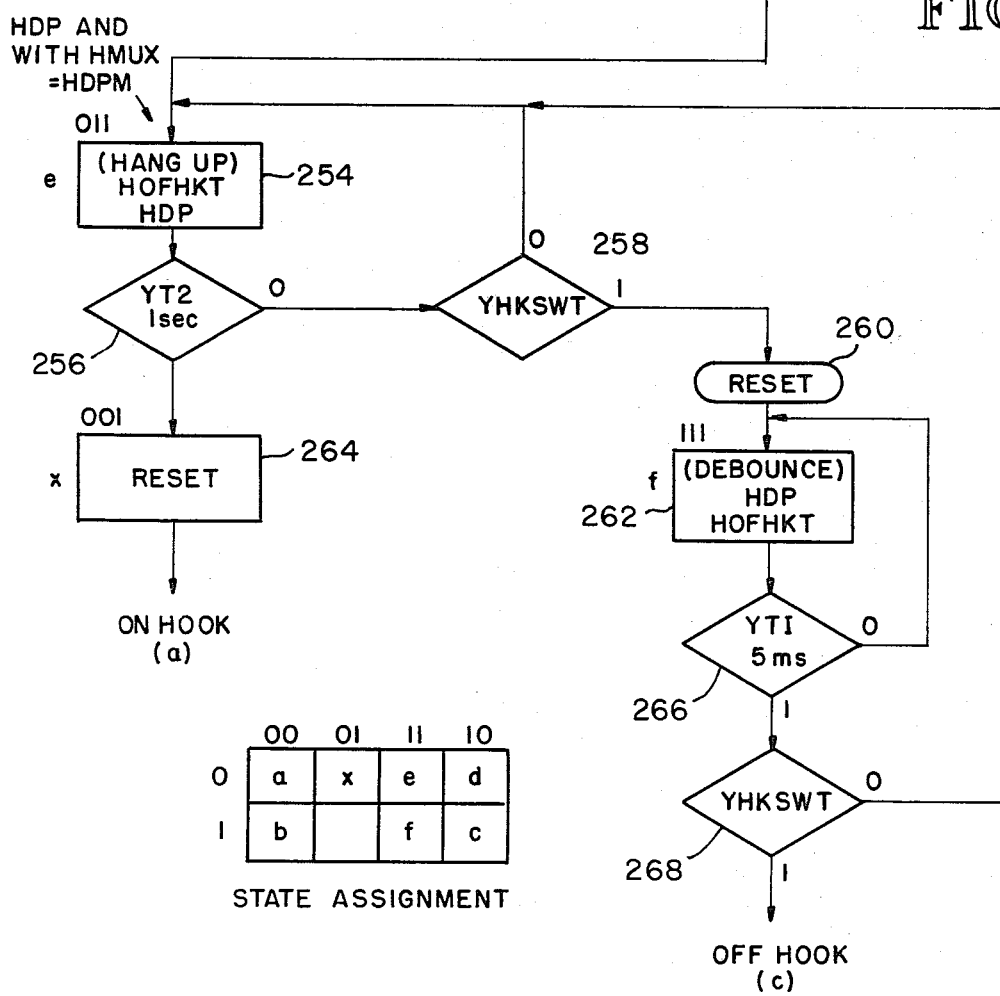
FIG. 6

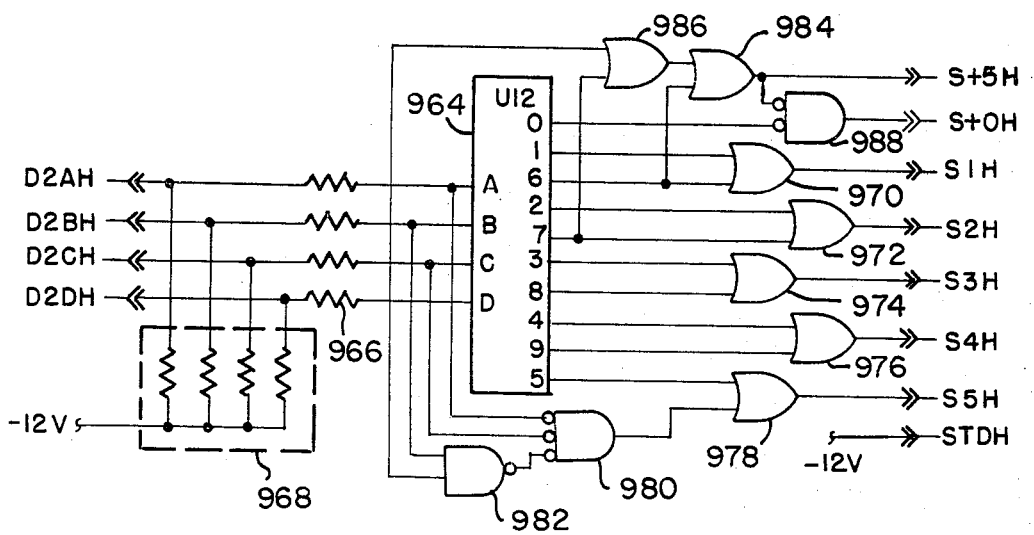
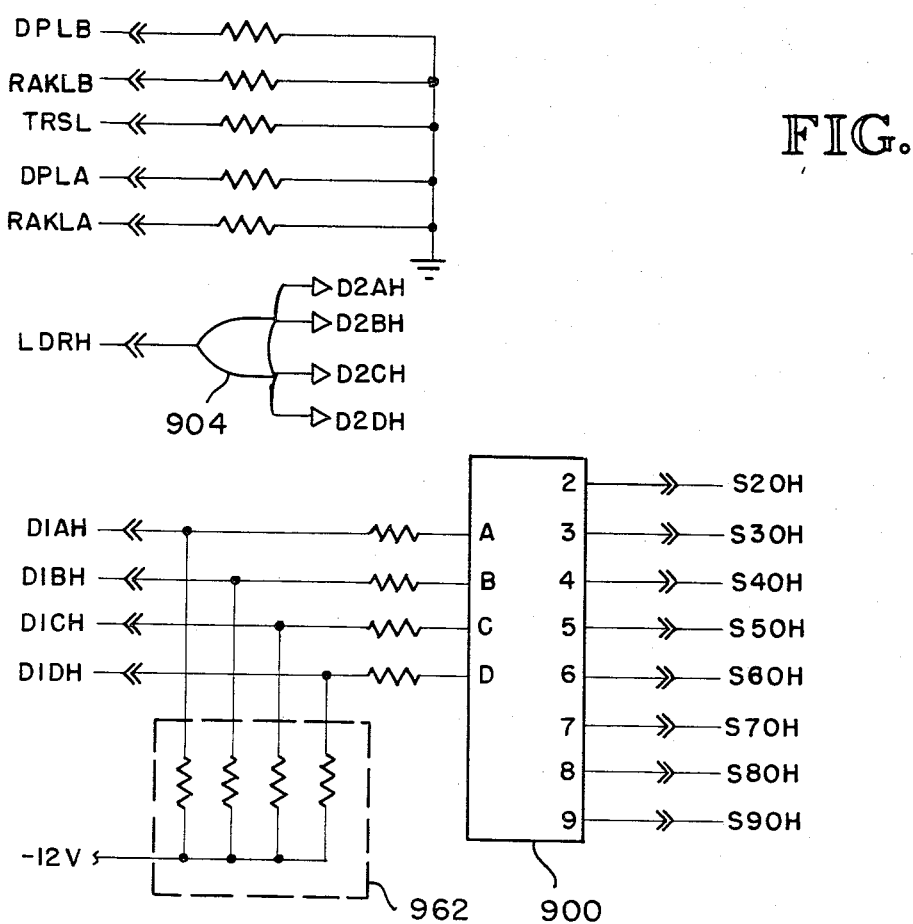
FIG. 21B

EXPANDABLE LINK TELEPHONE INTERCOM SYSTEM

BACKGROUND OF THE INVENTION

1. Field of the Invention

This invention relates to telephone intercom systems, and more particularly to a system for allowing several self-contained station controller circuits adapted for use with relatively few links to be operated together to expand the number of links in the intercom system.

2. Description of the Prior Art

Intercom systems have long been used for selectively connecting a calling telephone station to a called telephone station to allow two-way communication. Generally, these systems connect the stations to each other through individual audio links, the number of which is far less than the number of stations in the system. Consequently, link sharing by the stations is necessary. A call is initiated when a calling station sequentially scans the audio links in search of an unused link and, when it finds an available link, connects itself to that link. The calling station then generates the address of the called station by dialing with either a dualtone multi-frequency device or a rotary dialing device. Link controllers associated with individual audio links decode the address of the called station and cause the called station to connect itself to the audio link to which the calling station is connected.

Recently, a multi-link intercom system of this type has been available from Tone Commander Systems, Inc., of Redmond, Washington, under the model designation ML8000. This system employs four audio links, and all of the station controllers and link controllers for the system operate on a four-link access period basis. The ML8000 system features a self-contained large-scale integrated station controller which is only capable of connecting its station to one of four audio links and which, like the remainder of the system, inherently operates on a four-link access period basis.

Although the number of audio links required in an intercom system for a given number of stations varies depending upon the extent to which each station utilizes the intercom, it is generally necessary to increase the number of audio links as the number of stations accessing those links increases. Thus, the need has developed for intercom systems having eight or more audio links. Expansion of four-link intercom systems employing self-contained station controllers to allow a greater number of links to be accessed requires that the self-contained controller circuits properly interface with each other. The interfacing requirement could undoubtedly be met by merely increasing the number of called station address lines, control lines and other circuitry in proportion to the increase of audio links. However, this solution would result in an unacceptable proliferation of the interconnection wiring in the system.

Intercom systems having a substantially larger number of audio links are also more difficult to test than systems having fewer links. Thus, it is desirable to simplify testing by allowing the system to selectively make some of the links busy to facilitate testing of other links.

SUMMARY OF THE INVENTION

It is an object of the invention to provide a telephone intercom system which is easily expandable in increments of M links by parallel operation of self-contained station controllers each adapted to interface with M links.

It is another object of the invention to expand the number of audio links in an intercom system by operating several self-contained station controller circuits in parallel without requiring a corresponding increase in interconnection wiring.

It is a further object of the invention to facilitate testing of an intercom system having a relatively large number of links by preventing some of the links from being used.

These and other objects of the invention are provided by a telephone intercom system having a large number of station controllers each adapted to connect a telephone station to one of M links and each operating in M time multiplexed link available periods. The system allows N self-contained station controller circuits for each station to operate in parallel to collectively connect the station to M x N audio links, each of which are controlled by an individual link controller. The link controllers receive the address of the called station from the calling station, decode the address and apply the address as a station controller circuit enabling signal in time multiplexed form to the called station controller during one of N address valid periods of each of M link available periods corresponding to the link to which the calling station is connected. When the controller circuit in the called station controller is enabled, it connects itself to the audio link corresponding to the one of N portions of the M operating periods during which the enabling signal was received. All station controller circuits for a given station operate in the same one of M operating periods at the same time, and the N controller circuits for a called station controller must thus receive an enabling signal at the same time. Since the enabling signal for one controller circuit is received at a different time than enabling signals for other N-1 controller circuits (since only the one controller circuit is associated with the links to which the calling station is connected), the system retains the enabling signal received during each operating period for any of the controller circuits and then applies the enabling signal to the selected one of the N controller circuits at the same time that an enabling signal would be applied to any of the other controller circuits. The station addresses and internal control lines, being time multiplexed, convey the increased quantity of information resulting from increasing the number of links yet require relatively few additional interconnecting wires. The system also includes circuitry for selectively generating signals indicating that specific audio links are unavailable for use so that the remaining links, which may be far fewer in number than the total number of links in the system, can be easily tested.

BRIEF DESCRIPTION OF THE DRAWINGS

FIG. 4 is a schematic of the address decoder and an "A" link detect and delay circuit of the station controller which allows the self-contained station controller circuits to operate in parallel.

FIG. 5 is a timing diagram illustrating the addressing sequence for the station controllers.

FIG. 6 is a synchronous state logic diagram and state assignment chart of a hook state control circuit for determining if an off-hook or dial pulse condition has occurred.

DETAILED DESCRIPTION OF THE INVENTION

Figure 1:
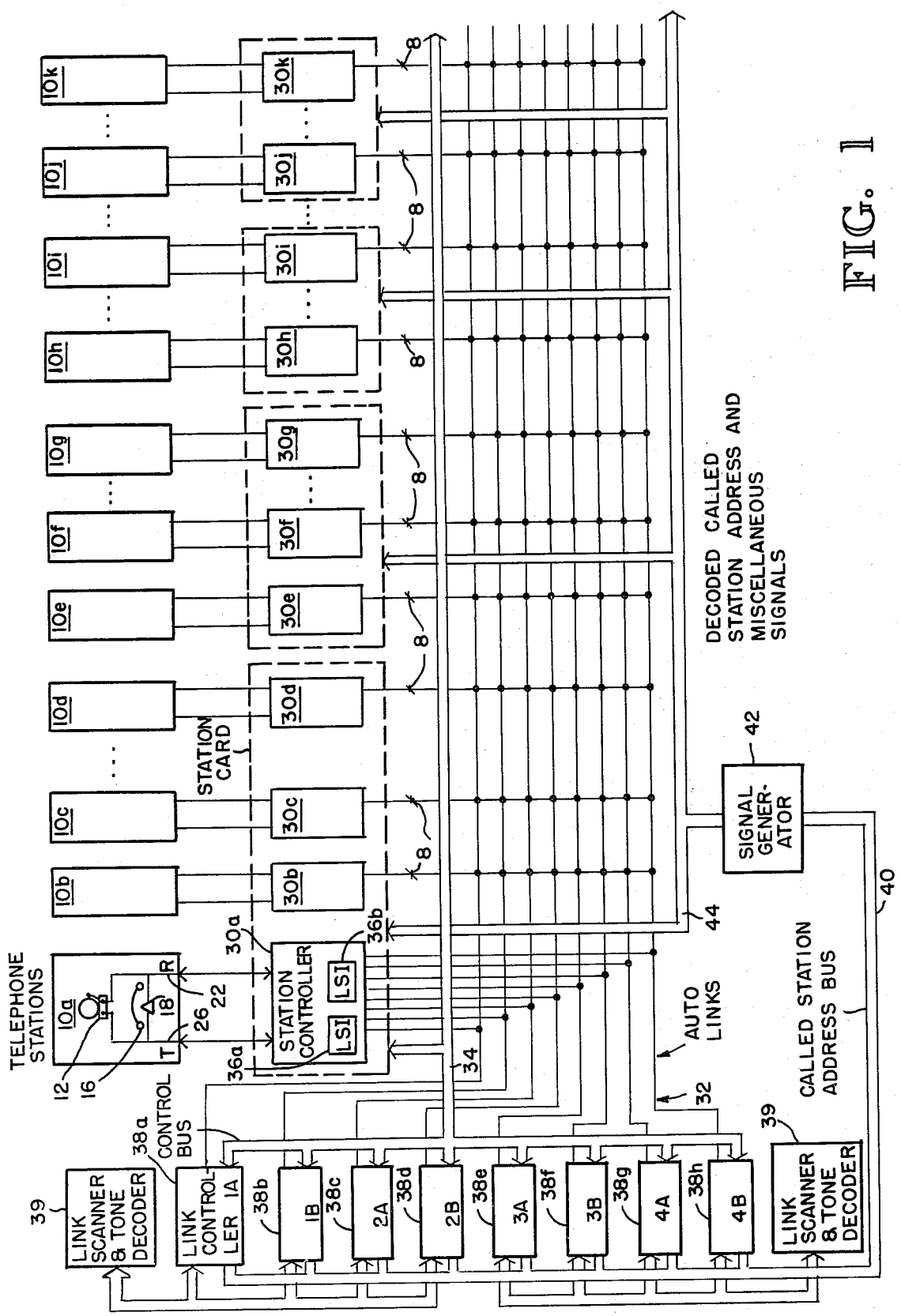
FIG. 1 is a block diagram of an intercom system employing individual, self-contained station controller circuits in expandable form.

A multi-link telephone intercom system employing the inventive link expanding circuitry is illustrated in FIG. 1. The system includes a large number of conventional key telephone stations 10 each having a conventional ring device 12, a hand set 16 and a dialing mechanism of either the rotary dial pulse generator or dual-tone, multifrequency (DTMF) variety associated hook switch and inductive coupling network 18 connected to tip and ring lines 20, 22, respectively. A dual pulse is the signal resulting from breaking loop current by the rotary dial of a telephone set. A number of dial pulses in sequence constitute a certain digit. The duration of dial pulse and the time between dial pulses have certain specified limits. Dual-tone multifrequency is an alternative method of signalling. Two sinusoidal tones are mixed and transmitted together. The frequency of one of these tones is from the low group: 697, 770, 852, 941. The frequency of the other tone is from the high group: 1209, 1336, 1477, 1633. A particular combination of two frequencies is interpreted as a certain digit. The tip and ring lines 20, 22 are normally unconnected by any direct current path when the handset 16 is on hook, but are connected to each other through inductive coupling network 18 when the handset 16 is raised off hook. Off-hook, as used herein, indicates the condition of a telephone set where the handset is removed from the cradle; that is, the telephone set is in use. In use, the audio signals received and generated by the handset 16 are present across the tip and ring lines 20, 22. A called station is dialed by either generating appropriate dual-tone multi-frequency signals across the tip and ring lines 20, 22 by a conventional tone dialing mechanism or by intermittently opening the direct current connection between the tip and ring lines 20, 22 a number of times corresponding to the number being dialed by a conventional rotary dialing mechanism.

The intercom system includes a large number of telephone stations 10, only one of which is illustrated in detail. Each of the telephone stations 10 is connected to a station controller 30 which selectively connects the audio output from the tip and ring lines 20, 22, respectively, to one of eight audio links 32 when the handset 16a is raised off hook. Basically, as explained in greater detail hereinafter, when the handset 16a is raised off hook, the station controller 30a scans the status of the audio links 32 in search of an unused link 32. When the station controller 30a finds an unused link 32, it connects the audio output from the telephone station 10a to the unused link and generates an appropriate signal on a partially bidirectional control bus 34 to prevent other station controllers 30 from connecting to that link 32. When one of the other telephone stations, 10h for example, is called, the station controller 30h associated with called station 10h causes the ringing device 12h of the called station 10h to be actuated and causes an appropriate ring acknowledgement control signal to be generated to the calling link controller 38 which responds by applying an audio RINGBACK signal to the link 32 which is then heard by calling station 10a. The RINGBACK signal is one of the call progress signals. It is formed by the modulation of a 440 signal by a 40 Hz signal. This, then, is transmitted for a duration of 0.8 seconds and off for 2.4 seconds. The ringback tone is transmitted to the calling party to indicate that the called party's telephone set is ringing. When the called station 10h answers the call by establishing an off-hook condition, its station controller 30h ceases actuation of the ringing device 12h and connects the audio output from the station 10h to link 32, thereby completing an audio link betwen stations 10a and 10h. If the called station 10h is busy, the station controller 30h will not return a ring acknowledgement control signal to the calling link controller 38 and an audio busy signal will be applied to the link 32 which is heard by the calling station 10a.

Each of the station controllers 30 contains two self-contained controller circuits 36 which are preferably large-scale integrated circuits. These circuits 36 were initially developed for a four-link intercom system. Consequently, the circuits are capable of controlling only four links and they inherently operate and receive control signals in a four time division multiplex mode corresponding to the four links. Use of this circuit 36 with intercom systems having eight or more audio links 32 presents the problem of allowing the circuits 36 to operate in parallel without adding a correspondingly larger number of interconnecting lines to the various signal buses and also necessitates the interconnection of control signals between the four link station controller circuits 36 to allow a priority scheme which will prevent the two independent station controllers 36 from simultaneously connecting a single station 10 to two audio links. A principal feature of the invention, then, is circuitry explained in detail hereinafter for allowing the integrated circuits 36 to operate in parallel while interfacing with each other and the remainder of the system.

Each of the audio links 32 is connected to a link controller 38. The link controllers 38 decode the station number being dialed by each of the calling stations 10 and generate appropriate coded signals on a called station address bus 40. Link scanners 39 sequentially scan four links in search of a link ready to receive dual-tone multi-frequency dialing signals and decode the dialing signals when received on that link. Thus four links share a single tone decoder. The link controllers 38 also generate appropriate four time division multiplexed signals on the control bus 34 and called station address bus 40 as explained in greater detail hereinafter. The coded called station address signals on bus 40 are decoded by a signal generator 42 which generates appropriate signals on bus 44 to cause the station controller 30 for the called station 10 to actuate its ringing device 12 and to connect itself to the proper audio link 32 when the called station 10 answers. The signal generator 42 also generates various signals for the remainder of the system, such as system clock signals, ringback tones and busy tones.

An understanding of the operation of the multi-link intercom system necessitates an understanding of the time multiplex scheme used to transfer a large amount of information on relatively few lines. Basically, a number of link access periods exist corresponding to the number of audio links 32 connected to each station controller circuit 36. Thus, the system illustrated in FIG. 1 utilizes four link access periods. During each link access period, a signal is generated on a link available bus (part of control bus 34) to indicate the status of the corresponding audio link. The link available bus consists of a number of separate lines corresponding to the number of circuits 36 employed in each station controller 30. A single link available line will then be required to indicate the status of each group of four links to be controlled by a set of station controller circuits 36 dedicated to that four link group. Thus, the link available bus for the system illustrated in FIG. 1 consists of two lines, designated LKAHA and LKAHB. An LKAHA signal is generated by circuit 42 during each link access period that the corresponding link of the first four links is available; i.e., not already connected to another station controller 30. Similarly, a LKAHB signal is generated by circuit 42 during each link access period that the corresponding link of the remaining four links is available.

When the telephone station 10a goes off-hook, the station controller 30a for that station 10a sequentially examines each of the link available lines LKAHA and LKAHB during each of the four link access periods. When an available link is found, the integrated circuit 36a or 36b associated with that link couples the telephone station 10 to that available audio link 32 and removes a link available signal on LKAHA or LKAHB otherwise present during the link access period corresponding to that link. The link available signal LKAHA or LKAHB then indicates to the remainder of the system that the link is unavailable for use by any other telephone station 10. After the telephone station 10 has been connected to a given audio link 32, the station 10, hereinafter referred to as the calling station, dials another telephone station 10, hereinafter referred to as the called station. The manner in which the called station is dialed depends upon the nature of the telephone station 10. Telephone stations 10 having conventional rotary dialing mechanisms open the connection between the tip and ring lines 20, 22 a number of times corresponding to the number being dialed. This dial pulse information is then time division multiplexed by the station controller and transmitted to the link controller 38. Telephone stations 10 employing a dual-tone multi-frequency dialing mechanism generate appropriate identifying audio tones across the tip and ring lines 20, 22, respectively, which are applied by the station controller 30 to the audio link 32 to which the controller 30 is connected. Generally, the calling station 10 will dial two digits in order to designate the called station. Regardless of which dialing mechanism is used, the dial pulses or audio tones are conveyed to the link controller 38 for the link 32 to which the telephone station 10 is connected. The link controller 38 then generates a time multiplexed code designating the called station on bus 40. The station address signal on the bus 40 is generated during the link access period corresponding to the link which the calling station 10 is connected. The called station 10 can determine which link its station controller 30 should connect to by synchronizing with the access period in which the address signal is received. However, there are eight audio links but only four link access periods. Thus, if a station address signal is received by a station controller 30 during the first access period, the controller 30 must determine whether it should connect to link 1A or 1B. This function is accomplished by further multiplexing the station address signals on bus 40 into two address valid periods corresponging to an "A" groove link address and a "B" groove link address. Thus, two address periods exist for each link access period providing a total of eight address valid periods uniquely identifying the eight audio links 32. Thus, if the leftmost telephone station 10a is connected to the link 3B, the address of the called station designated by the dialing mechanism of the calling station 10a is generated on the address bus 40 during the second address valid period of the third link access period. Other stations 10 connected to other links may also generate called station address signals on bus 40 during the address valid period of the link access periods corresponding to the links to which they are connected. The called station address signals on bus 40, which are in binary form, are decoded by the signal generator 42 and applied to the designated station controller 30.

A detection circuit in the station controller 30 of the called station 10 determines whether the called station address should be connected to either an "A" group link or a "B" group link corresponding to the link access period in which the address is received. Since the "A" group links are accessed by circuit 36a and the "B" group links are accessed by circuit 36b, the detection circuit determines which circuit 36a or 36b is active. This function is accomplished by storing the address for the first address valid period of the link access period and presenting it to controller circuit 36a while the address for the second address period of that link access period is applied directly to controller circuit 36b. Either of the circuits 36a or 36b can then be enabled at the same time, but only one circuit will be enabled since the station was only designated during one address valid period of the link access period.

If the station controller 30 for the called station 10 is not already connected to another audio link 32, it generates a ring acknowledge signal during the link access period corresponding to the link to which the called station controller 30 is connected. The station controller 30 is capable of identifying the proper time for generating RAKL since it should occur during the same link access period that it has been enabled by receiving its station address. In actuality, a ring acknowledge line connected to all of the station controllers 30 is provided for each circuit 36 in the station controller 30. Thus, for the system illustrated in FIG. 1, two ring acknowledge lines exist forming part of control bus 34 designated RAKLA and RAKLB. The non-busy called station controller 30a generates a signal on the RAKLA line during the appropriate link access period whenever the calling station 10 is connected to one of the "A" links. Similarly, the non-busy called station controller 36b generates a signal on the RAKLB line during the appropriate link access period whenever the calling station 10 is connected to one of the "B" links.

When called station 10 goes off-hook (i.e. answers), the ring acknowledge signal RAKLA or RAKLB terminates. The station controller 30 for the called station 10 then prevents a link available signal from being generated on the line LKAHA or LKAHB during the link access period corresponding to the link to which the calling station is connected. The station controller 30 for the called station also couples the tip and ring lines 20, 22 for the called station 10 to the same audio link that the station controller 30 for the calling station is connected. Two-way conversation is thus effected between the calling station 10 and the called station 10. If the called station 10 is already connected to an audio link 32, a ring acknowledge signal RAKLA or RAKLB is not produced during the appropriate link access period so that the link controller 38 for the link to which the calling station 10 is connected applies a busy audio signal from the signal generator 42 to the audio link 32 which is then received by the calling station 10. It should be mentioned that the above is a basic description of the entire multi-link intercom system. A complete explanation of the subcircuits and subsidiary features of the system are explained in greater detail hereinafter.

Figure 2:
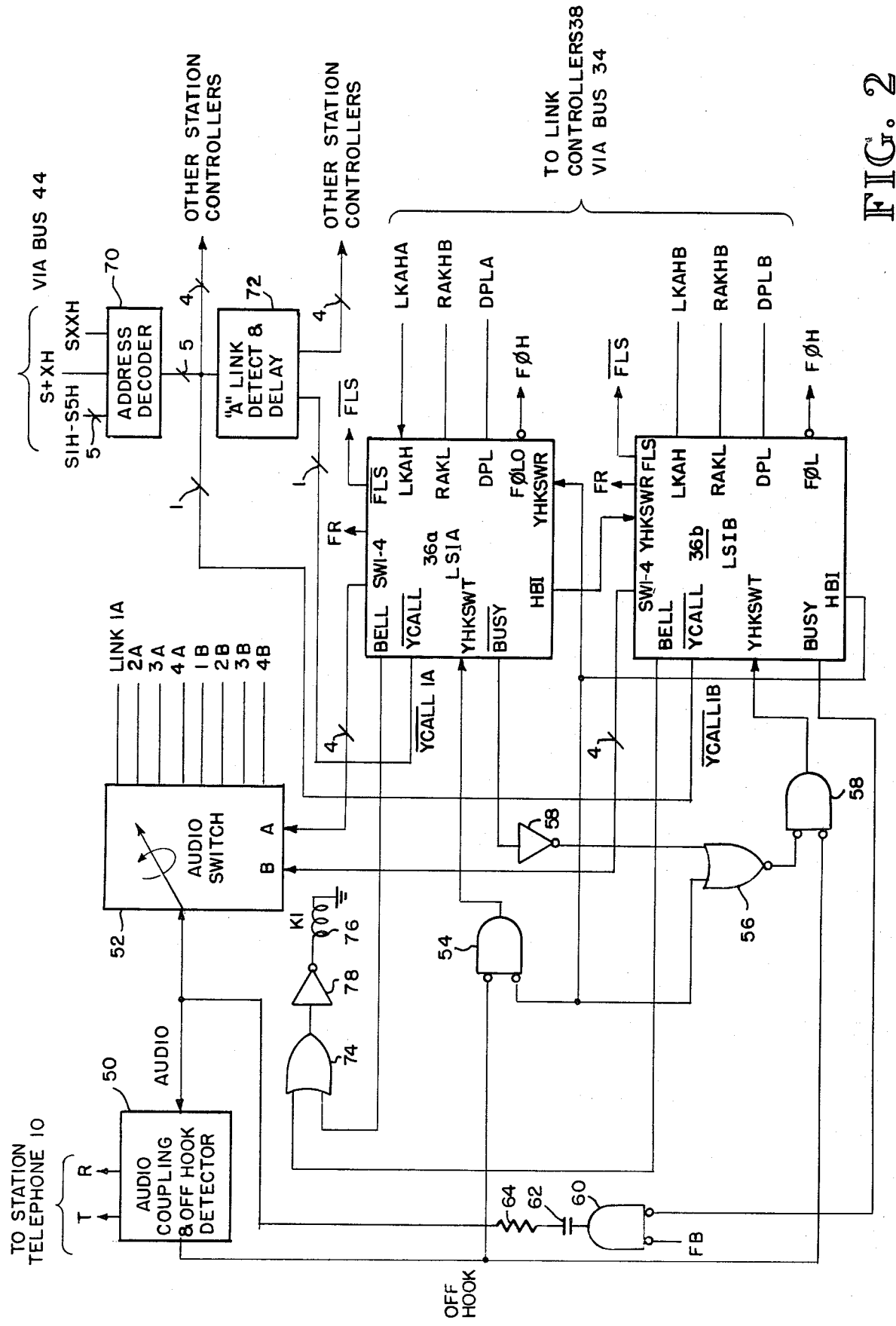
FIG. 2 is a schematic of a station controller utilizing a pair of self-contained station controller circuits operating in parallel.

A block diagram of a station controller 30 is illustrated in FIG. 2. The system includes an audio coupling and off-hook detector 50 connected to the tip and ring lines 20, 22 of the telephone 10. The audio coupling portion of circuit 50 couples the audio signal from the tip and ring lines to an audio output which is applied to an audio switch 52. The audio switch 52 connects the audio output from circuit 50 to one of the eight audio links 32 1a-4b as designated by the corresponding one of eight switch control lines on input terminals A and B. Signals appearing on the four switch control lines from the integrated circuit 36a switch the audio output of coupling circuit 50 to the "A" group links, 1A, 2A, 3A, 4A. Similarly, signals appearing on the four switch control lines from integrated circuit 36b switch the audio signal from coupling circuit 50 to the "B" group audio links 1B, 2B, 3B, 4B. Thus, the integrated circuits 36a,b select which of the audio links 32 the audio output of coupling circuit 50 is connected.

The off-hook detection portion of circuit 50 causes an OFFHOOK signal to go low (logic "0" or −12 V) when the handset 16 of the telephone 10 goes off-hook. This low is applied to NOR 54 which, it is assumed, is enabled by a low at its other output, thereby generating a high (logic "1" or 0 V) at the YHKSWT input to integrated circuit 36a. As explained in detail hereinafter, integrated circuit 36a then sequentially examines its LKAHA input during the four link access periods to determine whether any of the "A" group audio links are available. If one of the "A" group links is found to be available, the circuit 36a pulls the LKAHA bus low during that link access period so that no other stations will find that link to be available. The circuit 31a also transmits a signal to the audio switch 52 connecting the audio output of circuit 50 to that audio link.

If none of the "A" group links are available, the $\overline{BUSY}$ output of circuit 36a goes low, which places a high on the input to NOR gate 56 through inverter 58. NOR gate 56 then applies a low to NOR gate 58 which, since OFFHOOK is low, produces a high at the YHKSWT input to integrated circuit 36b. Circuit 36b then sequentially examines its LKAHB input during the four link access periods. If an available "B" group link is found, circuit 36b pulls LKAHB low during the access period corresponding to the available link and it transmits a signal to audio switch 52 to connect the audio line from circuit 50 to the appropriate "B" group link, 1B, 2B, 3B or 4B. It will be noted that the availability of a given link is determined by detecting whether LKAHA or LKAHB is high during the corresponding link access period. Since the circuits 36a,b pull the LKAHA or LKAHB lines low during the link access period corresponding to any link to which they are connected, none of the other station controllers 30 will detect a high state on the LKAHA or LKAHB lines during that link access period. Whenever either of the circuits 36a,b have been connected to a link, their HBI output goes high thereby preventing further operation of the other integrated circuit because of the high signal at its YKSWR input as explained hereinafter. Also, when none of the "A" group links are available but an available "B" link has been found, the HBI output of integrated circuit of 36b goes high, thereby disabling NOR gate 54 so that a high is not applied to the YHKSWT input to integrated circuit 36a which would cause the circuit 36a to connect the calling station to an "A" group link if an "A" group link subsequently became available.

If all of the "A" group links are found to be unavailable and the "B" group links are then likewise found to be unavailable, the $\overline{BUSY}$ output of integrated circuit 36b goes low, thereby enabling NOR gate 60 which gates a busy signal FB from the signal generator 42 through a capacitor 62 and a resistor 64 to the audio terminal of coupling circuit 50. A busy signal is then heard in the receiver of the handset 16 to indicate that none of the audio links 32 are available for use. Station busy signals; i.e., signals generated when a link is available but the called station is busy, are normally transmitted to the coupling circuit 50 via the audio link to which the circuit 50 is connected. However, where the system is busy; i.e., no audio links are available, and there is no audio link over which to transmit the busy signal to the coupling circuit 50. Consequently, the busy signal must be internally generated at the station controller 30.

After an audio link 32 has been found to be available, the audio terminal of the coupling circuit 50 is then connected to the available link by audio switch 52 by one of the four-line switch control outputs from either circuit 36a or 36b. The calling station then dials a number, typically two digits, corresponding to the number of a called station. If the calling station is equipped with a dialing mechanism which generates dual-tone multi-frequency dialing signals, the signals are applied directly to the link through the coupling circuit 50 and the audio switch 52. The link controller 38 for the link to which the audio switch 52 is connected then decodes the first and second digits of the called station and generates appropriate time multiplexed signals on bus 44 which are applied to an address decoder 70 as S1H, S2H, ... S5H, S+XH and SXXH. The Signals S+XH and SXXH act as enabling signals for the particular group of five stations. One of the other five lines, S1H, S2H ..., S5H then selects which of the particular group of five stations is being addressed. If the calling station telephone 10 is equipped with a rotary dialing mechanism, the OFFHOOK output of off-hook detector 50 pulses low a number of times corresponding to the number dialed. These pulses are coupled through either NOR gate 54 if the calling station is connected to an "A" group audio link or NOR gate 58 if the calling station is connected to a "B" group audio link. The integrated circuit 36a or 36b then determines whether valid dial pulses have been produced and, if so, generates a corresponding number of time division multiplexed pulses at the DPLA output of circuit 36a if an "A" group link has been accessed or the DPLB output of circuit 36b is a "B" group link has been accessed. These pulses are demultiplexed and counted by the link controller 38 for the link to which the calling station is connected and the link controller 38 generates appropriate signals on bus 40 which are decoded by the signal generator 42 and applied to the address decoder of the called station as S1H, S2H, ..., S5H, S+XH, SXXH. It should be remembered, at this point, that these station address valid signals S1H ... SXXH are time multiplexed so that they are only present at the called station address decoder 70 during the address period of the link access period corresponding to the link to which the calling station is connected. As mentioned above but explained in greater detail hereinafter, the circuits 36a, 36b are basically four-link devices operating with four-link access periods. In order to allow the circuits 36a, 36b to operate in parallel, the station address valid period for a station being dialed by a station connected to an "A" group link is interleaved with the station address period for that station being dialed by a station connected to a "B" group link. Since the calling station will be connected to either an "A" group link or a "B" group link, but not both, a station address for the called station is generated during only one of the two address periods of the link access period. Thus the station address periods in which an address signal is presented to the address decoder 70 for every station controller 30 in the entire system are interleaved as follows: link 1A, 1B, 2A, 2B, 3A, 3B, 4A, 4B. However since the circuits 36a are basically four link access period devices and are clocked by the same FOH signal, the address of the called station must be operated on at the same time regardless of whether the calling station is connected to an "A" group link (thus addressing controller circuit 36a) or a "B" group link (thus addressing controller circuit 36b). Consequently, it is necessary to delay and hold the "A" group link address signals by an "A" link detect and delay circuitry 72, so that the circuit 72 can apply any "A" group link address signals to the circuit 36a at the same time that the "B" link address signals from the address decoder 70 would be applied to the circuit 36b. Thus, if a given station is being called by a calling station connected to an "A" group link, the $\overline{YCALL}$ input to circuit 36a will be low at the same data sample point that the $\overline{YCALL}$ input to integrated circuit 36b would be low if the calling station was connected to a "B" group link. Proper operation of the system requires that the enabling signal $\overline{YCALL}$ to the appropriate circuit 36 occurs at the same time with respect to the clock signal F$\phi$H regardless of whether the calling station is connected to an "A" group link or a "B" group link.

After the appropriate controller circuit 36 receives its enabling signal $\overline{YCALL}$, it generates a ring acknowledge signal RAKL during the link access period corresponding to the link to which the calling station is now connected. The link controller 38 for that link detects the RAKL signal during the proper link access period and applies a ring-back signal to the link which is transmitted to the ear piece of the handset for the calling station as explained hereinafter.

The controller circuit 36a or 36b for the called station asserts its BELL output which is applied to OR gate 74 which drives a relay coil 76 through inverter 78. Thus, current flows through relay coil 76 whenever the BELL output of either integrated circuits 36a, 36b is asserted. As explained hereinafter, current flowing through the relay coil 76 closes a pair of contacts in the audio coupling and off-hook detector 50 which applies a high voltage AC signal to the tip and ring lines of the called telephone station 10 to actuate an internal ringer.

One of two events occur after the enabling signal $\overline{YCALL}$ for the circuit 36 of the called station is received. If the calling station 10 goes on-hook to discontinue the call, the link controller 38 removes the address for the calling station thereby terminating the enabling signal $\overline{YCALL}$ for the called station. If the called station goes off-hook (i.e. answers), the ring acknowledge signal RAKLA or RAKLB generated by the circuit 36a or 36b for the called station terminates so that the ring-back tone is removed from the audio link 32 and the LKAHA or LKAHB output of the circuit 36a or 36b, respectively, for the called station is pulled low during the link access period corresponding to the link to which the calling station is connected so that the called station will remain connected to the link even if the calling station goes on-hook. Also, of course, the controller circuit 36a or 36b for the called station connects the audio coupling circuit 50 for the called station to the proper link through audio switch 52. Two-way conversation is then effected between the calling station and the called station.

Figure 3:
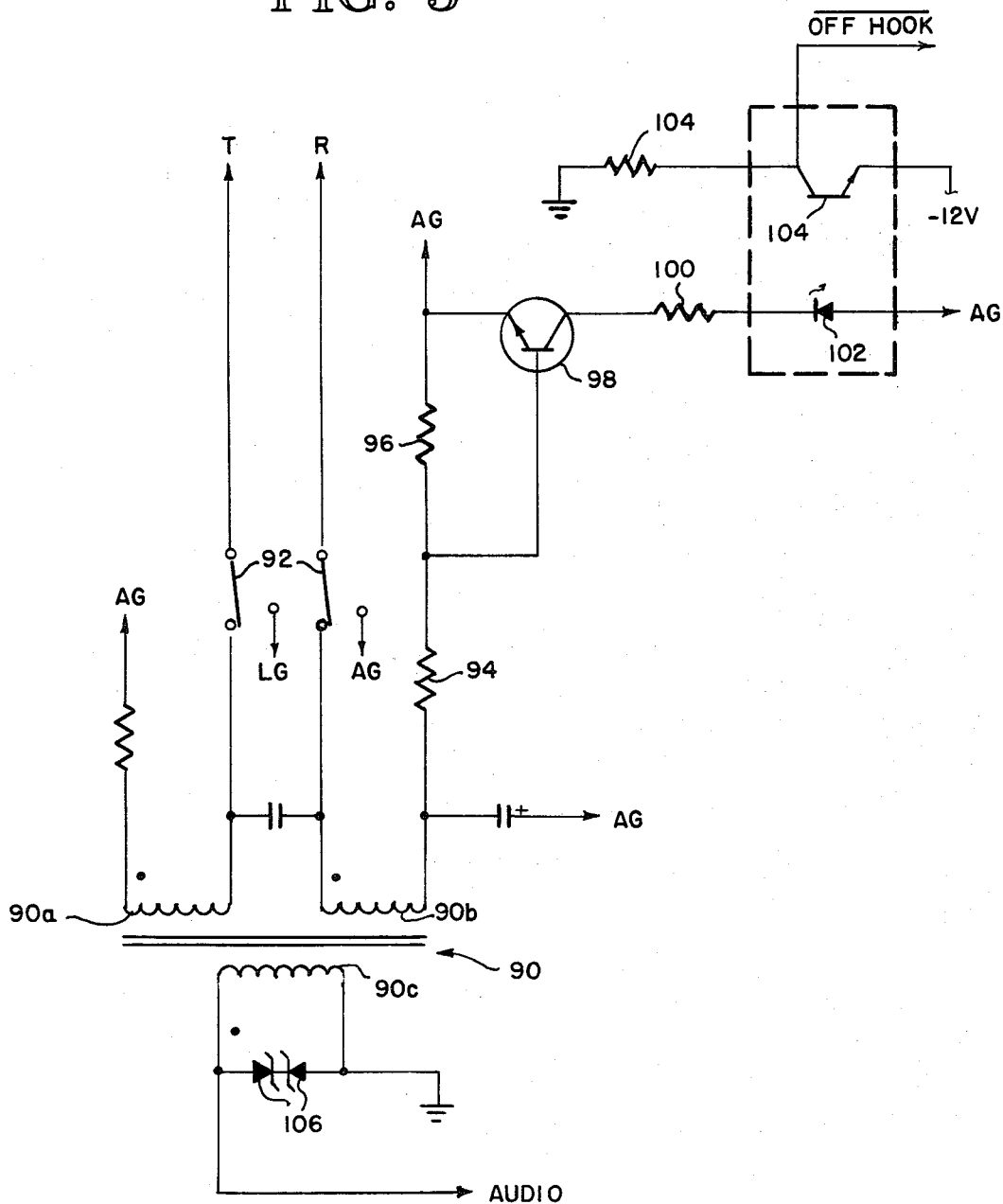
FIG. 3 is a schematic of an audio coupling and off-hook direction circuit of the station controller of FIG. 2.

A schematic of the audio coupling and off-hook detector 40 of the station controllers 30 is illustrated in FIG. 3. The tip and ring lines are connected to split windings of a transformer 90 through relay contacts 92. Current flow then occurs from the audio ground AG through windings 90a, the telephone station 10, the windings 90b to audio battery AB, normally −24 volts, through resistors 94, 96. When the handset 16 for a telephone station 10 is on-hook, the tip and ring lines are not connected to each other so that no current flows from audio ground to audio battery. When the handset 16 goes off-hook, the impedance between the tip and ring lines drops substantially so that sufficient current flows from the audio ground AG to audio battery AB to generate enough voltage across resistor 96 to forward bias the base emitter junction of transistor 98. Current then flows from audio ground to audio battery through resistor 100 and a light emitting diode 102. Light from the light emitting diode 102 is directly coupled to a phototransistor 104 which then conducts current from ground to a −12 volt supply to resistor 104. Under these circumstances OFFHOOK goes low, and it is this OFFHOOK signal that is applied to the NOR gates 56, 58 of the circuit of FIG. 2. After the audio output of the circuit is connected to an audio link by switch 52, audio communication from the tip and ring lines is effected through the transformer 90. A pair of series connected Zener diodes 106 are connected across winding 90c to protect other circuitry in the system from excessively large voltage transients.

With reference also, now, to FIG. 2, when the enabling signal $\overline{\text{YCALL}}$ is received by an integrated circuit 36 for a called station as explained above, the BELL output of the circuit 36 goes high. Current then flows through relay coils 76. The relay coil 76 switches the relay contacts 92 between lamp ground LG and a high voltage AC signal AS which actuates the ringer 12 for the called telephone station 10. When the handset 16 for the called station goes off-hook, the BELL signal terminates causing the relay contacts 92 to return to the position illustrated in FIG. 3, thereby allowing two-way communication through the transformer 90.

A schematic of the address decoder 70 and "A" group link detect and delay circuitry 72 is illustrated in FIG. 4. As explained above, the function of the address decoder 70 and "A" group link detect and delay circuitry 72 is to present an enabling signal $\overline{\text{YCALL}}$ to the appropriate integrated circuit 36a,b at the same time during a link access period whether or not the calling station is connected to an "A" group link or a "B" group link. Since the address for a called station is received at different times depending upon whether the calling station is connected to an "A" group link or a "B" group link, it is necessary to retain the address signal from an "A" group link calling station until the address signal from a "B" group link calling station would be received.

The address of the called station from the bus 44 is applied to the decoder 70 as S1H, S2H . . . S5H, S+XH and SXXH. The SXXH input designates the first digit of the called station so that ten sequentially numbered stations having an identical first digit will be interconnected to the same SXXH bus. Thus, stations 20–29 will all be connected to the S20H address bus. The S+XH address line designates either the low order five numbers for the second digit or the high order five numbers for the second digit. Thus, stations having a second digit of from 1 to 5 are interconnected by the S+0H bus while stations having a second digit of from 6 to 0 are interconnected by the S+5H address bus. The remaining address buses, S1H, S2H . . . S5H, designate the higher or lower order numbers for the second digit. Station 23 would thus have its SXXH input connected to the S20H bus, its S+XH input connected to the S+0H bus and is S3H input connected to the S3H bus. During the link access period of the link to which the calling station was connected, the S3H input as well as the S+20H and S+0H inputs would go high. If the calling station is connected to an "A" group link, these buses would go high during the first address valid period of the link access period. If the calling station is connected to a "B" group link, these busses would go high during the second address valid period of the link access period. Consequently, the output of NAND gate 120 would go low, thus enabling NAND gates 122–133 through NAND gate 132. Since NAND gate 128 is enabled, the high at its S3H input would produce a low at the $\overline{\text{YCALL}}$ 2B input to the controller circuit 36b during the link access period to which the calling station is connected which is clocked into circuit 36b by the next clock pulse F$\phi$H. The outputs of the NAND gates 122–130 during an "A" group link access period are clocked to the respective outputs of flip-flops 134 so that the outputs presented to the circuit 36a and they can be clocked into circuit 36a by the same clock pulse that would have clocked $\overline{\text{YCALL}}$ into circuit 36b. If the calling station is connected to a "B" group link during the next clock cycle, the station address for the called station is decoded by NAND gates 120–130 and applied the YCALL outputs to the integrated circuit 36b for connecting the called station to the "B" group audio links. If the calling station is connected to an "A" group audio link and dials 28, the S20H and S+5H inputs to NAND gate 120 go high and the S3H input to NAND gate 126 goes high during the first address valid period of the link access period for the "A" group link to which the calling station is connected. At the end of that clock cycle, the high at the output of NAND gate 126 and the lows at the output of NAND gates 122, 124, 128, 130 are clocked to the respective outputs of flip-flop 134. During the next address valid period, neither S20H, S+5H nor S3H go high since the calling station is not connected to a "B" group link. If the calling station was connected to a "B" group link, S20H, S+5H and S3H would be low during the second address valid period of the link access period corresponding to the "B" group link to which the calling station is connected, but they would be high during the following address valid period of that link access period. As explained hereinafter and as illustrated in FIG. 5, the decoded called station address is placed on bus 44 slightly in advance of when the circuits 36a are clocked by F0H. The clock pulses, F0H, are delayed one-quarter of a link access period, however, so that the circuits 36a or 36b are clocked during the middle of the period that the station address is valid when the calling station is connected to a link. During the previous clock pulse, F0H, a valid station address, when the calling station is connected to an "A" group link, is clocked to the output of flip-flops 134. Consequently, valid called station address signals generated by a calling station connected to an "A" group link apply an enable signal $\overline{\text{YCALL}}$ to the "A" group controller circuit 36a by the flip-flops 134 at the same time that the controller circuit 36b would receive an enable signal $\overline{\text{YCALL}}$ generated by a calling station connected to a "B" group link.

Figure 9:
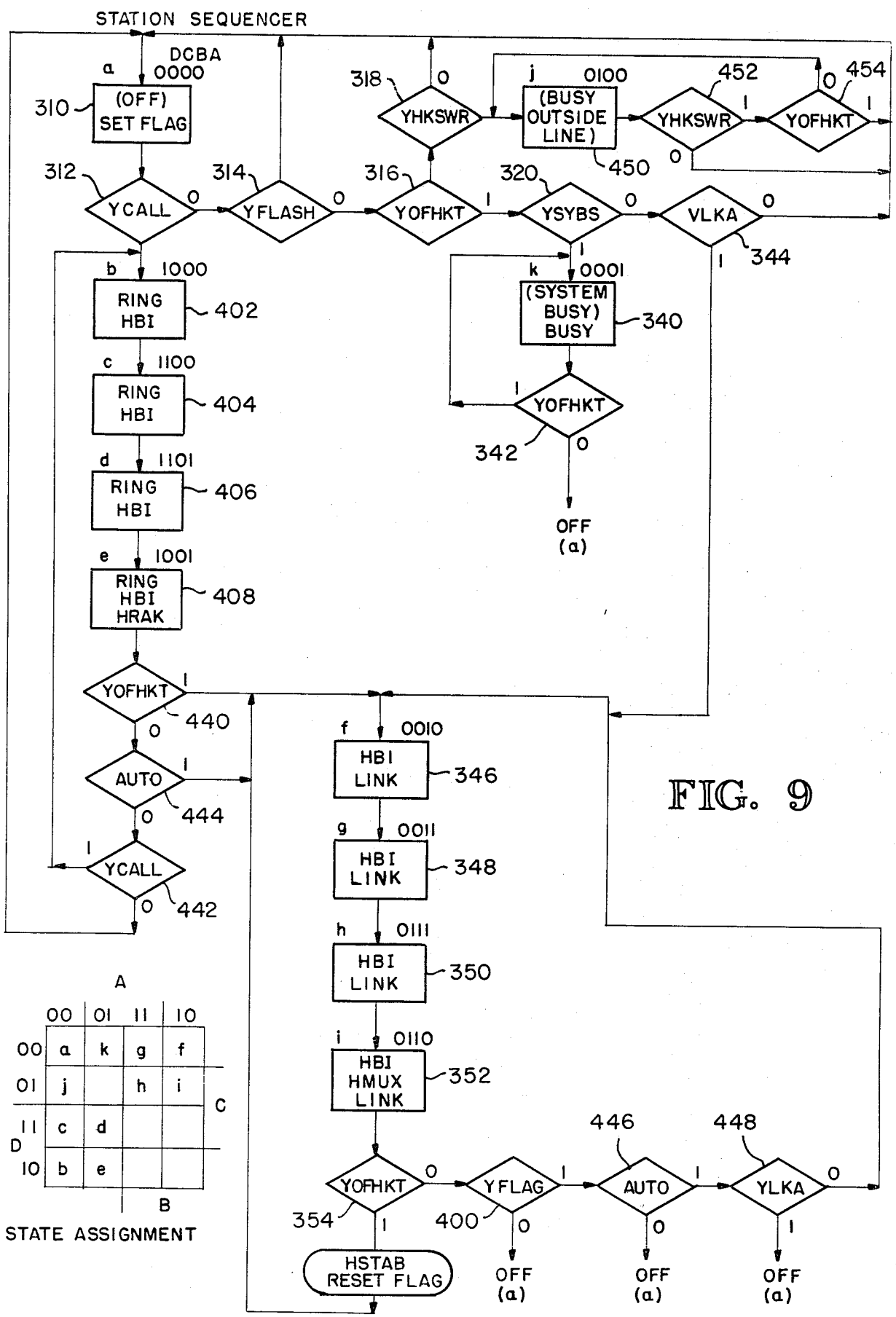
FIG. 9 is a synchronous state logic diagram and state assignment chart of a section sequencer for controlling the operation sequence of the station.

The operation of the self-contained controller circuit 36, which is preferably a large-scale integrated circuit, can best be understood by reference to the synchronous state logic diagrams of FIGS. 6 and 9. Basically, a synchronous state logic diagram identifies a number of system states by rectangular blocks, decision points by diamonds and conditional outputs by ovals. Each state is given a designating letter and identified by a binary number. State assignments are then listed on a state assignment chart in matrix form with the corresponding state designator placed in the proper location. The state assignment chart is then examined to ensure that only one binary digit changes at a time as the system moves from one state to any other state. This assures that the system will not enter any transient, unanticipated state. Once the synchronous state logic diagram is generated and states are properly assigned, logic components implementing the synchronous state logic diagram can be easily generated. In the synchronous state logic diagrams of FIGS. 6 and 9 input variables are preceded by a Y or N indicating that the variables are either asserted high or low, respectively. Thus, YCALL indicates that a YCALL input will be high if the CALL variable is asserted. Outputs bear an H or L prefix designating whether the output is asserted by either a high or low voltage level, respectively. Outputs are generated whenever the system is in a state in which the block for that state lists the output.

Figure 7:
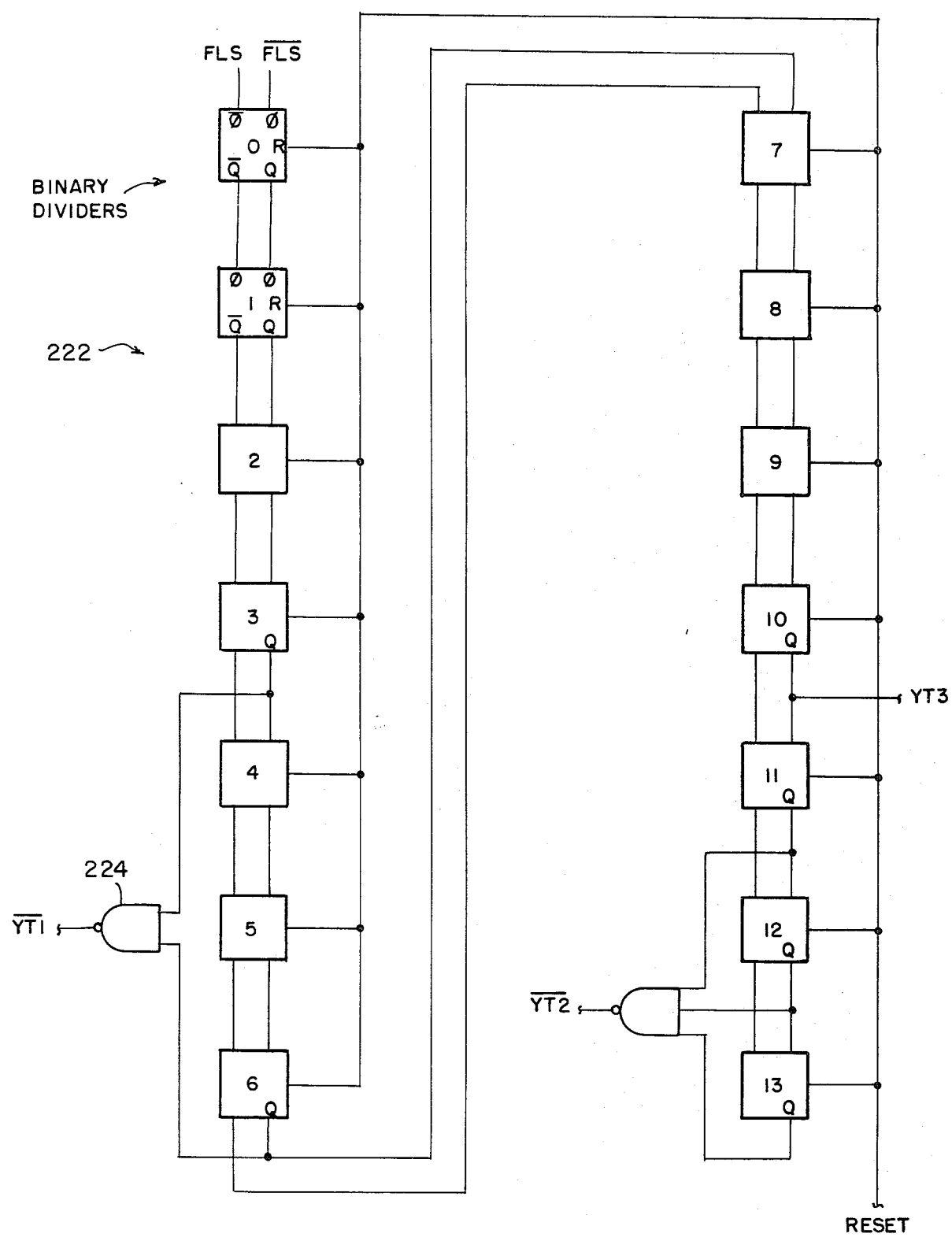
FIG. 7 is a schematic of a call progress timer used with the hook state control circuit of FIG. 6.

A synchronous state logic diagram for determining whether the handset 16 for a station 10 is off-hook is illustrated in FIG. 6. Initially, the system is in state a and all of the flip-flops implementing the logic diagram and defining the states corresponding to the state variables XYZ are reset. In state "a" a RESET output is produced to prevent an internal timer 220 illustrated in FIG. 7 (shown hereinafter) from incrementing and to retain all of the flip-flops in a reset condition. The hook switch input YHKSWT is continuously examined at 210 and as long as YHKSWT is low or logic "0", the system remains in a state "a" loop. When YHKSWT goes high, the system shifts to state "b" at 202, thereby removing the RESET output and allowing the internal timer to start counting. As illustrated in FIG. 7, the call progress timer 220 includes a number of cascaded flip-flops designated generally at 222 which are toggled by FLS pulses occurring once ever four link access periods. A YT1 is generated at the output of NAND gate 224 five milliseconds after the RESET input to the flip-flops 222 is removed, a YT2 signal is produced at the output of NAND gate 226 one second after the RESET input to the flip-flops 222 is removed and a YT3 signal is produced at the output of one of the flip-flops 222 73 milliseconds after the RESET input to the flip-flops 222 is removed. These timing signals are utilized to debounce the YHKSWT input to ensure that it is not simulated by a transient voltage level and to determine whether a high-to-low transition of YHKSWT is either a dial pulse the handset 16 going on-hook.

As the call progress timer 220 continues to increment in state "b", the YT3 output of the counter 220 is continuously examined at 240. After 73 milliseconds, YT3 goes high and YHKSWT is then reexamined at 242. If YHKSWT is still high, thus indicating that the original YHKSWT was not produced by a transient, the system enters state "c" at 244 in which the call progress timer 220 is reset by the RESET output and an off-hook tip output HOFHKT is produced. If YHKSWT was found to be no longer high at 242, the system returns to state "a" in which a RESET output is produced to reset the call progress timer 220. The system then continues to examine the YHKSWT output at 200.

Assuming that YHKSWT is still found to be high at 242, the timer 220 is reset and the HOFHKT output is produced in state "c" at 244, thereby indicating a valid off-hook condition exists. In state "c" the YHKSWT input is continuously examined at 246. If YHKSWT goes low again, the system enters state "b" at 248 in which the RESET output is removed, thereby starting the call progress timer 220 and continuing to generate an HOFHKT output indicating that a valid off-hook condition continues to exist. YHKSWT can go low responsive to either the station going on-hook, a dial pulse produced by a rotary dialing mechanism or a transient pulse of noise on a line. While the call progress timer 220 continues to increment, YT1 is continuously examined at 250. After five milliseconds, YT1 goes high, thereby causing the state of the YHKSWT input to be reexamined at 252. If YHKSWT is still high, the system returns to state 244 at which the timer is reset and YHKSWT is reexamined at 246. YHKSWT, being high at 252, indicates that the original YHKSWT low was produced by a transient noise pulse since neither a dial pulse nor an on-hook condition would produce YHKSWT low for less than five milliseconds. If, after five milliseconds, YHKSWT is still found to be low at 252, the system switches to state "e" at 254 in which a dial pulse output HDP is generated and a valid off-hook output HOFHKT continues. The call progress timer 220, which began incrementing in state d at 248, has continued to thereafter increment since a RESET output has not been produced during this time. In state "e" the YT2 input is continuously examined at 256. Before YT2 goes high after one second, YHKSWT is continuously examined at 258. If, at any time during the one-second interval YHKSWT goes high, the counter 220 is reset at 260 and the system enters state "f" at 262. Normally, YHKSWT will go high during the one-second interval if YHKSWT went low at 252 by either a dial pulse or a transient noise pulse. If, however, YHKSWT went low at 252 because the handset 16 went on-hook, YHKSWT will continue to be low after one second as determined at 256. The system then switches to a transition state "x" at 264 in which a RESET output is produced to reset the call progress timer 220. The system then reverts to original state "a". The transition state "x" is required so that only a one-state variable will change at a time when transitioning from state "e" to state "a" as illustrated by the state assignment chart of FIG. 6.

When the system is in state "f" at 262 a dial pulse output HDP and a valid off-hook HOFHKT are produced. The YT1 input is continuously examined at 266 during this period and after five milliseconds it goes high. YHKSWT is then reexamined at 268. If YHKSWT is now low, the system reverts to state "e" at 254. A logic high YHKSWT at 258 indicates that YHKSWT must have have been produced by a transient noise pulse since a dial pulse would last longer than five milliseconds so that YHKSWT would still be low after five milliseconds. In summary, when the handset 16 goes off-hook, the system shifts to state "c" at 244 in wait of a dial pulse or an on-hook condition. Either a dial pulse, an on-hook condition or a transient noise pulse causes the system to enter state "e" at 254 in which it is determined which of these conditions produced YHKSWT. If the YHKSWT low was an on-hook condition, the system reverts to state "a" via transition state "x" at 264; and if YHKSWT low was a dial pulse, a dial pulse output HDP is produced and a valid off-hook condition HOFHKT is produced for the duration of the dial pulse generated by the dialing mechanism after which the system returns to state "c" at 244 in wait of another dial pulse or an off-hook condition.

Figure 8:
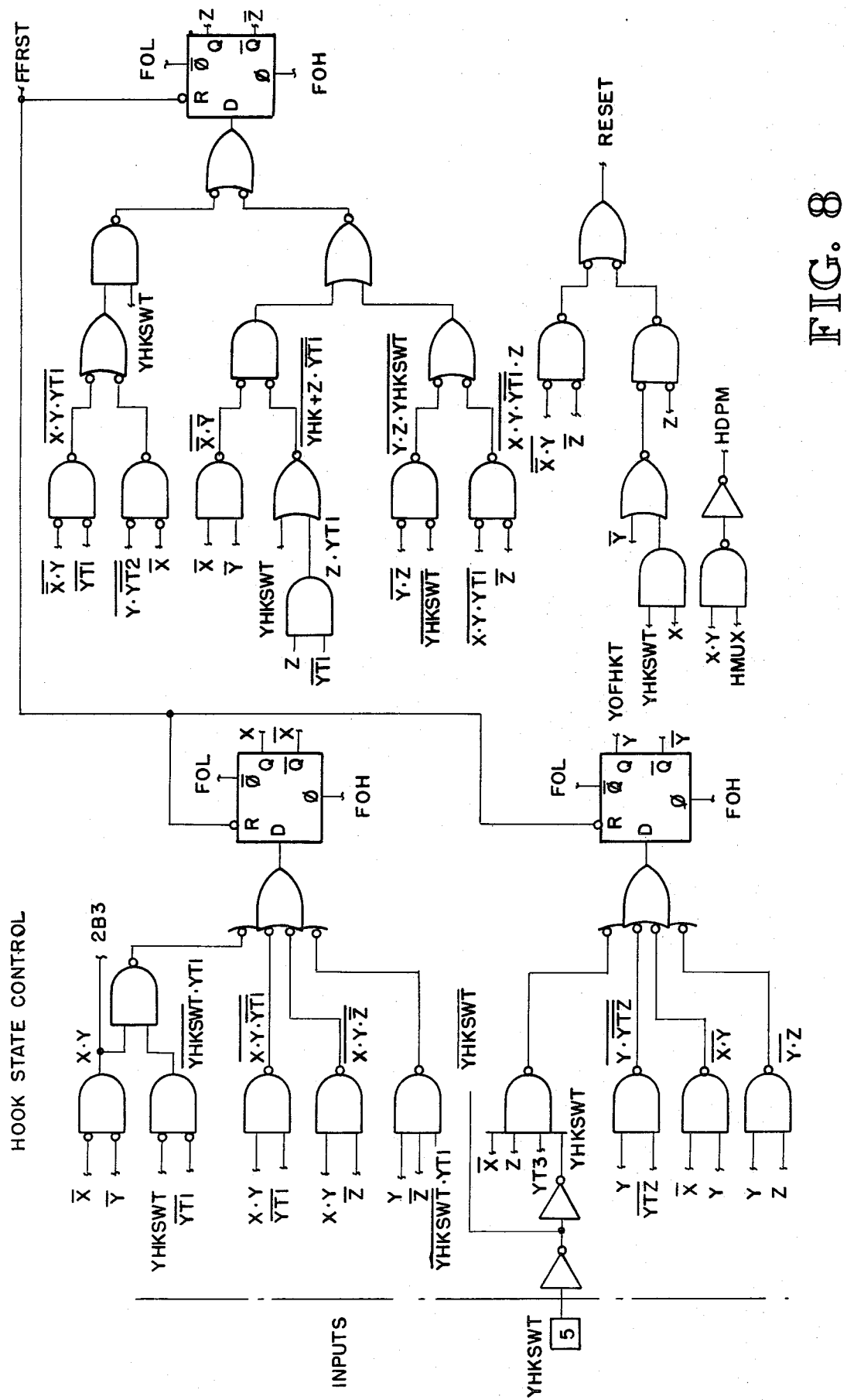
FIG. 8 is a schematic of one implementation of the synchronous state logic diagram of FIG. 6.

One implementation of the synchronous state logic diagram utilizing standard logic circuits is shown in FIG. 8.

A synchronous state logic diagram for a station sequencer portion of circuit 36 is illustrated in FIG. 9. Each circuit 36a or 36b controls access to only four audio links, either the "A" group links or the "B" group links. The system is initially in state "a" at 310. Assuming that the station is idle and no calls are coming in, YCALL is found to be low at 312, YFLASH is found to be low at 314, YOFHKT is found to be low at 316 and YHKSWR is found to be low at 318 so that the system remains in state "a". When the station handset 16 is taken off-hook, YOFHKT goes high, as explained in reference to the synchronous state logic diagram of FIG. 5, causing the system to examine YSYBS at 320. As explained hereinafter, YSYBS is generated whenever all of the audio links are busy. It operates independently and assynchronously of the station sequencer of FIG. 9 and examines the status of all of the links to determine if any links are available for access by the station controller. As explained above, a high is generated on the LKAHA line during any link access period in which its corresponding "A" group link is available. Similarly, a high is produced on the LKAHB line during any link access period when its corresponding "B" link is available.

Figure 10:
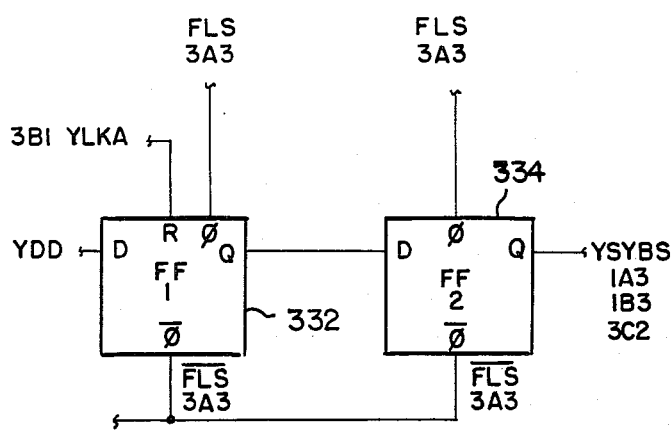
FIG. 10. is a schematic of a circuit for determining when all of the audio links in the intercom system are busy.

A circuit 330 for generating YSBYS whenever none of the audio links in the system are available is illustrated in FIG. 10. A logic high present on the data input to flip-flop 332 is clocked to its Q output by an FLS pulse which occurs during each link access period for link 1A and 1B. If one of the four audio links to which the controller circuit 36 is connected is available, YLKA will be high for at least one of the link access periods, causing flip-flop 332 to be reset before the high on the data input is clocked to its Q output by the next FLS pulse. Thus at the end of four link access periods the output of the flip-flop 332 is clocked to the output of flip-flop 334 by the subsequent FLS pulse. If YLKA reset the flip-flop 332 during any of the link access periods before the FLS pulse clocks flip-flop 334, a logic low at the output of flip-flop 332 is clocked to the output of 334. If YLKA has not gone low during any of the four link access periods prior to the FLS pulse clocking the flip-flop 334, the logic high which was previously clocked to the output of flip-flop 332 is clocked to the output of flip-flop 334. It should be remembered that one system busy circuit 330 is provided for each circuit 36 controlling either the "A" audio links or the "B" group audio links. As explained above, if YSYBS exists for the circuit 36 controlling the "A" group audio links, the circuit 36b examines LKAHB in search of an available "B" group link. If system busy circuit 334 circuit 36b controlling the "B" group audio links is unable to find an available "B" group link, a system BUSY signal is produced which causes a busy signal to be transmitted to the ear piece of the calling station.

With reference back to the station sequencer synchronous logic diagram of FIG. 9, if all of the audio links are busy, the system enters state "k" at 340 in which a BUSY output is produced. YOFHKT is continuously examined at 342 in state "k", causing the system to remain in state "k" as long as the handset for the calling station remains off-hook. When YHKSWT (FIG. 6) goes low responsive to hanging up the handset, a logic low YOFHKT occur causing the system to return to state "a" at 310.

If that at least one audio link is available when the YOFHKT goes high, the system examines YLKA at 344 until all the link access period corresponding to the available link is reached at which time YLKA (the LKAHA or LKAHB inputs to circuits 36a,b, respectively) goes high. The system then sequences through states "f", "g", "h" and "i" in blocks 346, 348, 350, 352, respectively. In all of these states 346-352 an HBI output is produced to indicate that the controller circuit 36 is busy. In state "i", YOFHKT is examined at 354. If YOFHKT is high, the system produces an HSTAB output at 356 and continues to sequence through states "f", "g", "h" and "i".

Figure 11:
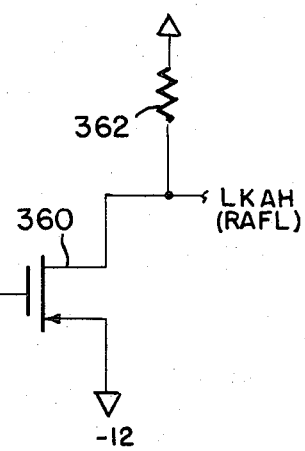
FIG. 11. is a schematic of a circuit for controlling the state of link available and ring acknowledge busses for the station controllers.

The HSTAB output is connected to the gate of a field effect transistor (FET) 360 illustrated in FIG. 11. The drain of the FET is connected to the LKAHA output of the controller 36 and, in its open drain condition, is normally held at ground by resistor 362. Whenever the HSTAB output is produced, the LKAHA bus is pulled low during the link access period to indicate that the station controller is connected to the audio link corresponding to that link access period. A different circuit of the same configuration is used to generate a ring acknowledge signal RAKL from an HRAK signal.

Figure 12:
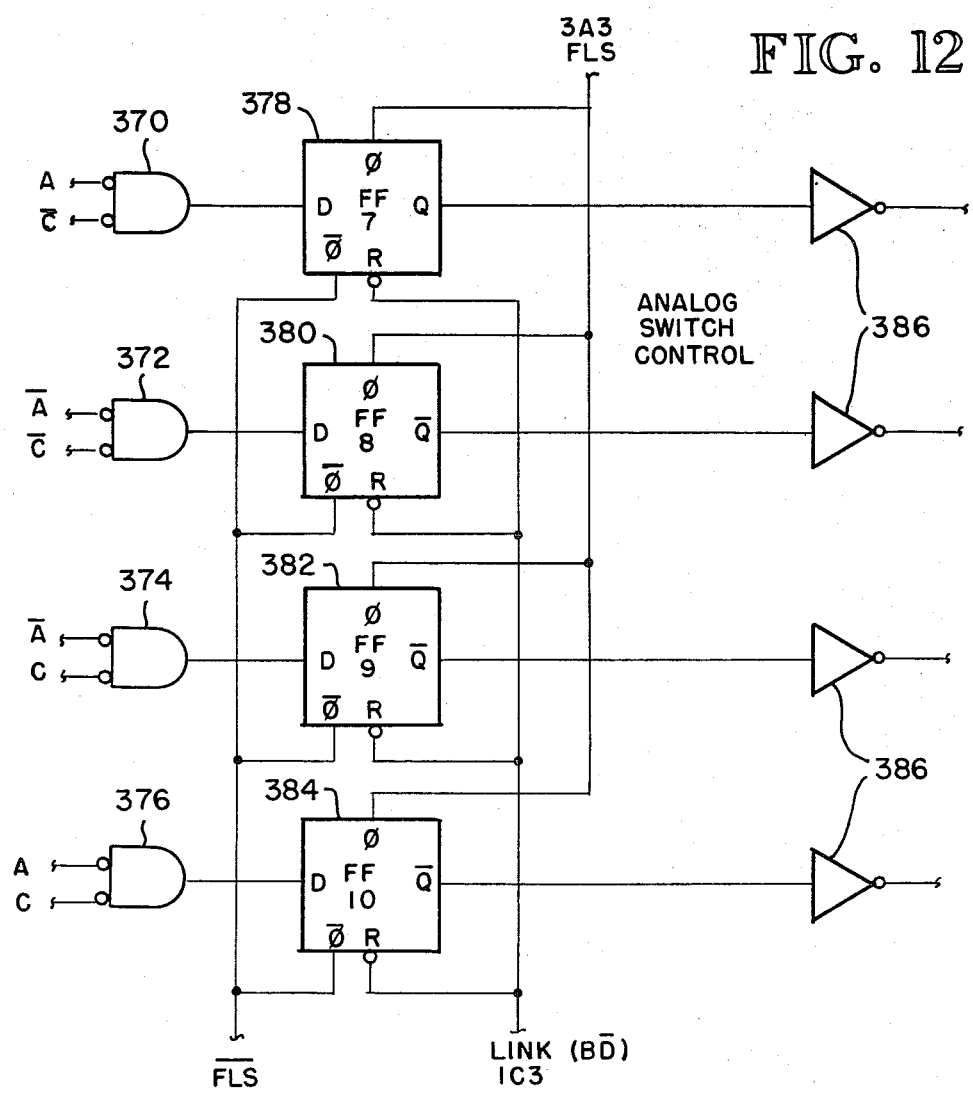
FIG. 12 is a schematic of a circuit for controlling analog switches to selectively connect a station to an audio link.

Referring back to FIG. 9, an internal flag is also reset at 356 whenever the station sequencer has followed the above-described loop, thereby indicating that the station has been off-hook and connected to an audio link. The system, in states "f", "g", "h" or "i", also produces a LINK signal which enables an analog switch control illustrated in FIG. 12. With reference now, also, to FIG. 12, two state variables "A" and "C" for the four states "f", "g", "h" and "i" are decoded by NOR gates 370-376 that feed the data inputs of respective flip-flops 378-384. Thus, a high is applied to flip-flop 384 in state "f" since state variable "A" and state variable "C" are both logic low during this state but not in states "g", "h" or "i". Similarly, flip-flop 378 receives a logic high from NOR gate 370 in state i since state variable "A" is low and state variable "C" is high during this state. The flip-flops 378-384 are clocked by the FLS pulse which marks the beginning of the link scanning cycle. Thus the Q outputs of the flip-flops 378 indicate which of the four states "f", "g", "h" or "i" that the station sequencer was in at the time the link scanning cycle began. This provides demultiplexed information identifying which audio link the station is connected to in order to connect the output of audio coupling circuit 50 to the proper link by switch 52 (FIG. 2). The outputs of flip-flops 378-384 are connected to the switch outputs of circuit 36 through respective inverters 386.

To understand the manner in which the switch control circuit of FIG. 12 identifies which link has been accessed, it is important to follow the timing sequence of the system as it cycles through states "f", "g", "h" and "i". Assume for purposes of illustration that YLKA is determined to be high at 334 during the link access period for the third audio link (either link 3A or link 3B). The system then enters state "f" at 346 during the fourth link access period, state "g" at 348 during the first link access period, state "h" at 350 during the second link access period and state "i" at 352 during the third access period. As the system remains in the loop continuing to sequence through states "f-i" the sequencer always enters state i during the third link access period. Consequently, when the flip-flops 378-384 of FIG. 12 are clocked by the FLS pulse occurring during the first link access period, the system will be in state "g" at 348 so that only NOR gate 374 will be producing a high output. This high output is clocked to the output of flip-flop 382 to drive analog switch No. 3.

Referring back to the synchronous state logic diagram of FIG. 9 for the station sequencer, the station continues to sequence through states "f", "g", "h" and "i" as long as YOFHKT remains high as determined at 354, thereby indicating an off-hook condition. When the station goes on-hook again, YOFHKT goes low. The station sequencer, in state "i", then examines an internal flag at 400. Since the station has been off-hook and on a link, the flag was reset at 356 so that the station shifts to an OFF condition, state "a".

The sequence for receiving an incoming call as explained with reference to FIG. 9. If a called station is idle, it will be in state "a" at 310. An incoming call is indicated by a high logic levl for YCALL multiplexed in the link access period corresponding to the link to which the calling station is connected (it being remembered that the decoder 70 and "A" link delay and detect circuit 72 of FIG. 2 caused the enabling signal $\overline{YCALL}$ to be presented to the circuit 36 at the same time regardless of whether the station address was valid during the first part of the link access period because the calling station was connected to an "A" link or during the second part of the link access period because the calling station was connected to a "B" link). The station sequencer recognizes the YCALL high signal at 312 causing the system to sequence through states "b", "c", "d" and "e" at 402, 404, 406 and 408, respectively. In state "e", the sequencer will be synchronized with the incoming call so that a ring acknowledge pulse HRAK is generated during the link access period corresponding to the link to which the calling station is connected. In this regard sequencing through the states "b-e" to synchronize the HRAK output with the link access period of the calling station is similar to the manner in which sequencing through states "f-i" synchronizes the LINK output in state "i" to link access period for the first available link. Thus, if a call is received on link 2 the system enters state "b" during the third link access period, state "c" during the fourth link access period, state "b" during the first link access period and state "e" during the second link access period.

The HRAK output produced at 408 controls an FET 360 (FIG. 11) having an open drain which is normally pulled high through resistor 362. However, the drain of the FET 360 is pulled low during the link access period corresponding to the link to which the calling station is connected by the HSTAB signal which is produced during that time. As explained above, the RAKL signal informs the calling link controller 38 that the called station is not busy and causes a ring-back signal to be transmitted to the calling station.

Referring back to FIG. 9, the sequencer continues to recirculate through states "b", "c", "d" and "e" at 402-408 as long as the called station remains on-hook and the calling station remains off-hook (assuming that the called station is not in the auto-answering mode as explained hereinafter). The system, in states "b-e", also generates a RING output which is applied to a ring-out circuit 420 to produce the BELL output for use as explained in reference to FIG. 2.

Figure 13:
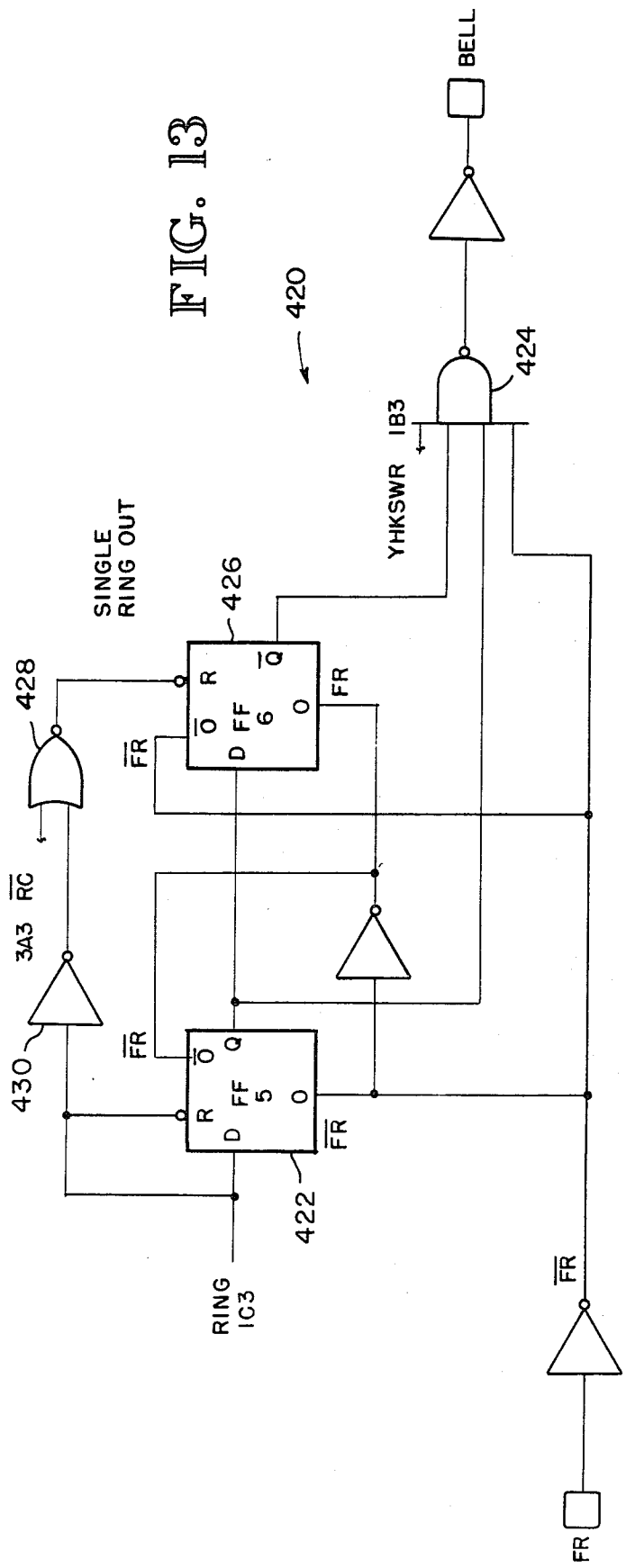
FIG. 13 is a schematic of a ring out circuit used by the station controller for actuating a ringing device in a called telephone station.

As illustrated in FIG. 13, the ring-out circuit 420 provides the option of single burst ringing depending on the state of RC. If the station sequencer is in states "b", "c" "d" or "e", RING is high thereby removing the reset from flip-flop 422. On the next negative transition of FR, the Q output of flip-flop 422 goes high enabling the output NAND gate 422 causing BELL to go high. If RC is high, the high output of flip-flop 422 is clocked into flip-flop 426 on the next positive transition of FR which disables the output gate so that BELL is produced for only one ringing pulse. Because FR is used to used to clock the flip-flops 422-426, the ring control circuit 420 will not ring out until a full FR cycle begins, thereby disallowing the possibility of a short ring-out pulse. If RC is low, flip-flop 426 is held reset and the gate will be enabled as long as RING is high, thereby producing multiple ringing. As soon as RING goes low, flip-flop 422 is reset, gate 424 is disabled and BELL drops low. Also, flip-flop 426 is reset through NOR gate 428 and inverter 430. When YHKSWR is high, gate 424 is also disabled so that no ringing occurs after a called station goes from on-hook ringing to off-hook on an outside line not connected with the intercom.

Returning, once again to the synchronous state logic diagram of FIG. 9, the sequencer will continue to recirculate through states "b-e" with the state of YOFHKT being checked at 440 each cycle. If the called station does not answer and the calling station discontinues the call, YCALL will go low which will be detected at 442 to cause the sequencer to return to the idle state, state "a". If the station answers, the transition of YOFHKT from low to high will be detected at 440, causing the sequencer to sequence through states "f-i" as explained above. The called station will now be synchronized to the link to which the calling station is connected and its analog switch will connect the audio of the called station to that link. The sequencer then recirculates through states "f-i" in the same manner as described above when the link was accessed from the idle state "a" by the calling station.

The station sequencer also includes an auto-answer capability which causes the called station to automatically answer if it is not already busy. The auto-answer capability is enabled by setting the AUTO input high by manipulating a manually actuated switch. When the station sequencer is in state "a" and the station is called, the sequencer will step through states "b-e" at 402-408. When the sequencer is in state "e", a HRAK pulse is sent to the link controller 38 for the link to which the calling station is connected. Since the called station is on-hook, YOFHKT for the called station is low. However, because the auto-answer feature has been enabled, AUTO is high as determined at 444 causing the sequencer to transition from state "e" to state "f" even though YOFHKT is still low. The sequencer then steps through steps "f-i" in synchronism with the link access period for the link to which the calling station is connected in the same manner as if the called station went off-hook causing YOFHKT to go high. However, since the called station is still on-hook when the sequencer reaches state "i", YOFHKT is low as determined at 354. Since the internal flag has not been reset at 356, the sequencer then follows a different recirculation path from the recirculation path followed if the called station goes off-hook. Since YOFHKT is low and YFLAG is still high as detected at 400, AUTO is high as detected at 446 and, since the calling party is connected to the link, YLKA is low as detected at 448, causing the sequencer to recirculate to state "f" at 346. The sequencer will continue recirculating through states "f-i" as long as YLKA is at zero, meaning that the calling party is still on the link. If the called station goes off-hook, the sequencer branches from the previous recirculation path at 354, thereby resetting the internal flag at 356 and causing LKAH to be pulled low through the FET 360 (FIG. 11). The called station now has control of the link to which the calling and called stations are connected. If the called station subsequently goes on-hook, YOFHKT goes low. However, since the flag has been reset at 356, the station then transitions through 354 and 400 to state "a", the idle state.

The YHKSWR input at 318 allows the station to be put into a state that will not produce a ring acknowledge. Starting from state "a" at 310, if the calling station is not off-hook on the intercom line, YOFHKT is low and the YHKSWR input is also low. However, if a station goes off-hook but is not connected to an intercom line, YOFHKT remains low but YHKSWR goes high. Since YOFHKT has been determined to be low at 316 and YHKSWR has been determined to be high at 318, the system shifts to state "j" at 450. The sequencer remains in this inactive state as long as YHKSWR is found to be high at 452, resulting from the station remaining off-hook, and YOFHKT is found to be low at 454, resulting from the station not being connected to an intercom line. If the station goes on-hook, a YHKSWR low is detected at 452 to return the sequencer to state "a" at 310. Similarly, if the station becomes connected to an intercom line while off-hook, a YOFHKT high is detected at 454 to transition the sequencer first through state "a" at 310 and then immediately to 344 through 312, 314, 316 and 320. The inactive state "j" at 450 prevents the station from returning a ring acknowledge if the station happens to be addressed by a calling station. Since a ring acknowledge RAKL is not produced by the called station, the calling station will not receive a ring-back. Thus, when a station is connected to an outside line it will not produce an audible ring when the station is selected by a calling station.

Figure 14:
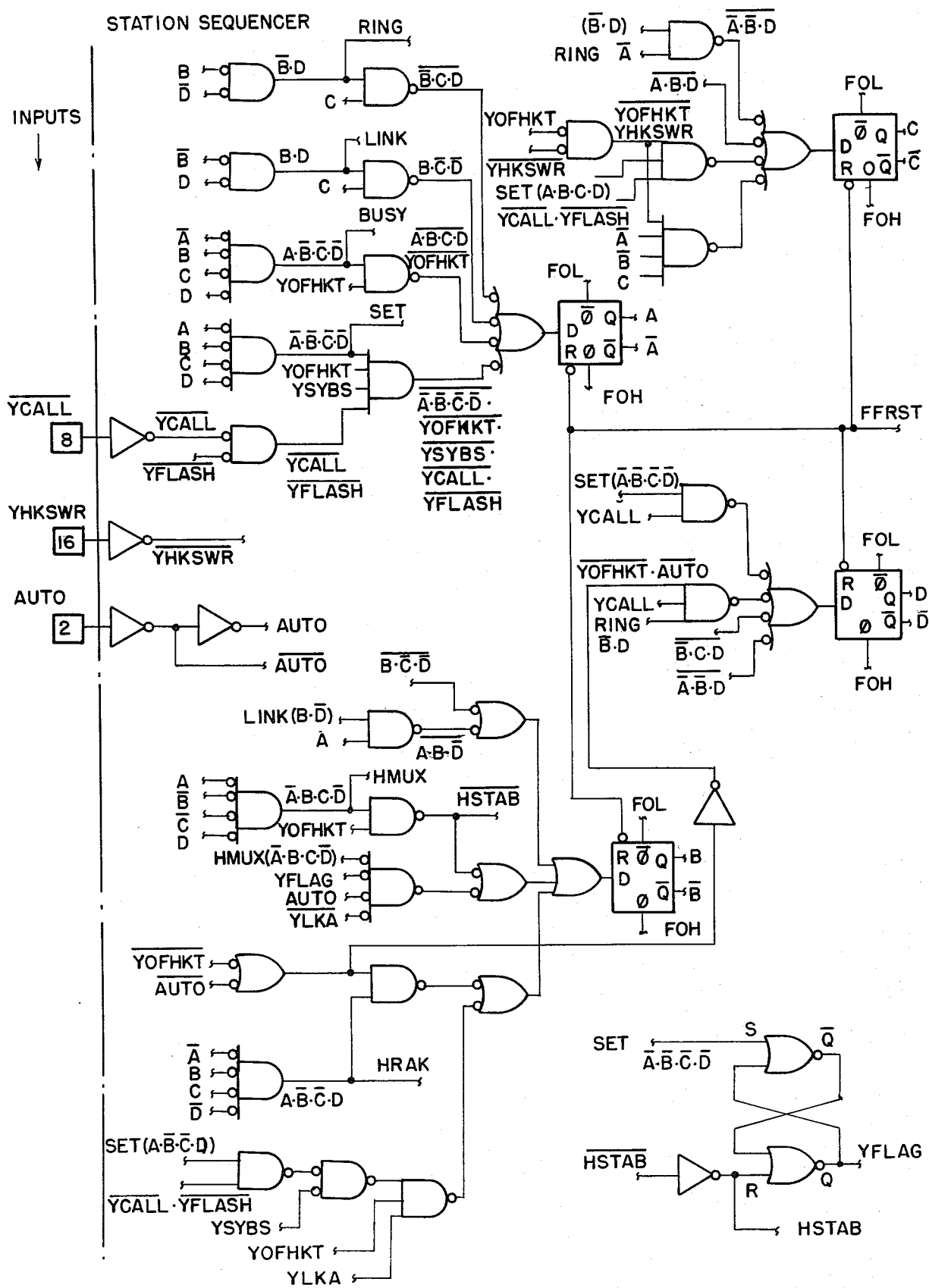
FIG. 14 is a schematic of one implementation of the synchronous state logic diagram of FIG. 9.

As mentioned above, implementation of the station sequencer once a synchronous state logic diagram and a state assignment chart has been prepared is fairly straightforward. One implementation of the station sequencer of FIG. 9 is shown in the schematic of FIG. 14. The efficiency of a logic circuit produced from a synchronous state logic diagram is relatively high but, unfortunately, the apparent complexity of the logic circuit implementation of the synchronous state logic diagram resulting from that efficiency limits the ability to easily and quickly understand a system by reference to the logic circuit implementation. For this reason the system has been explained with reference to the synchronous state logic diagrams of FIGS. 6 and 9 instead of by reference to the logic circuit implementations of FIGS. 8 and 14.

The primary purpose of the link controllers 38 is to facilitate and control the process of making an intercom call. It decodes dialing signals from a dual-tone multi-frequency dialing mechanism or dial pulses from a rotary dialing mechanism, sends station address signals to the signal generator 42 via a time division multiplexed bus 40 to designate a called station and applies call progress tones to its audio link.

Figure 15:
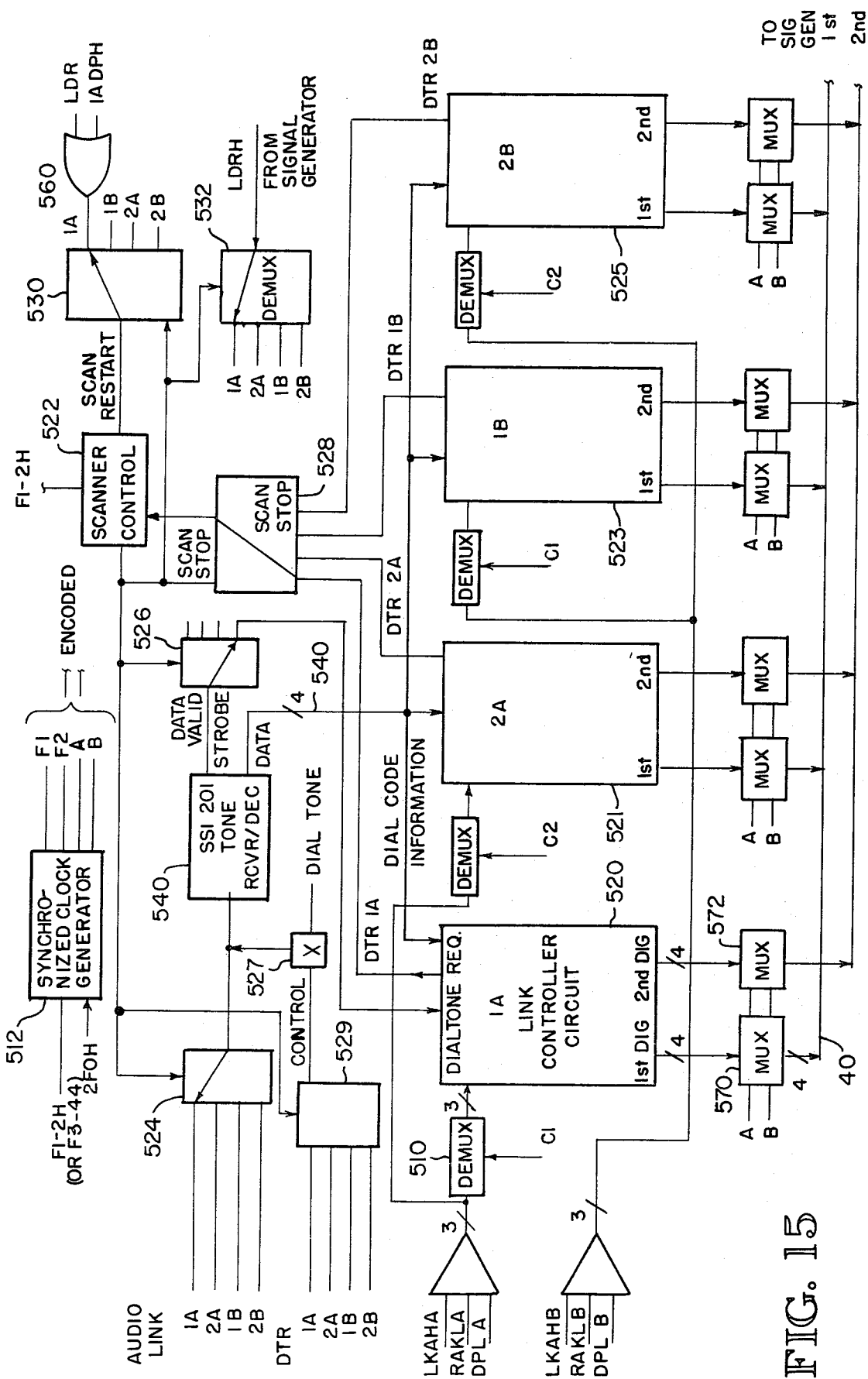
FIG. 15 is a block diagram of four link controllers.
Figure 16A:
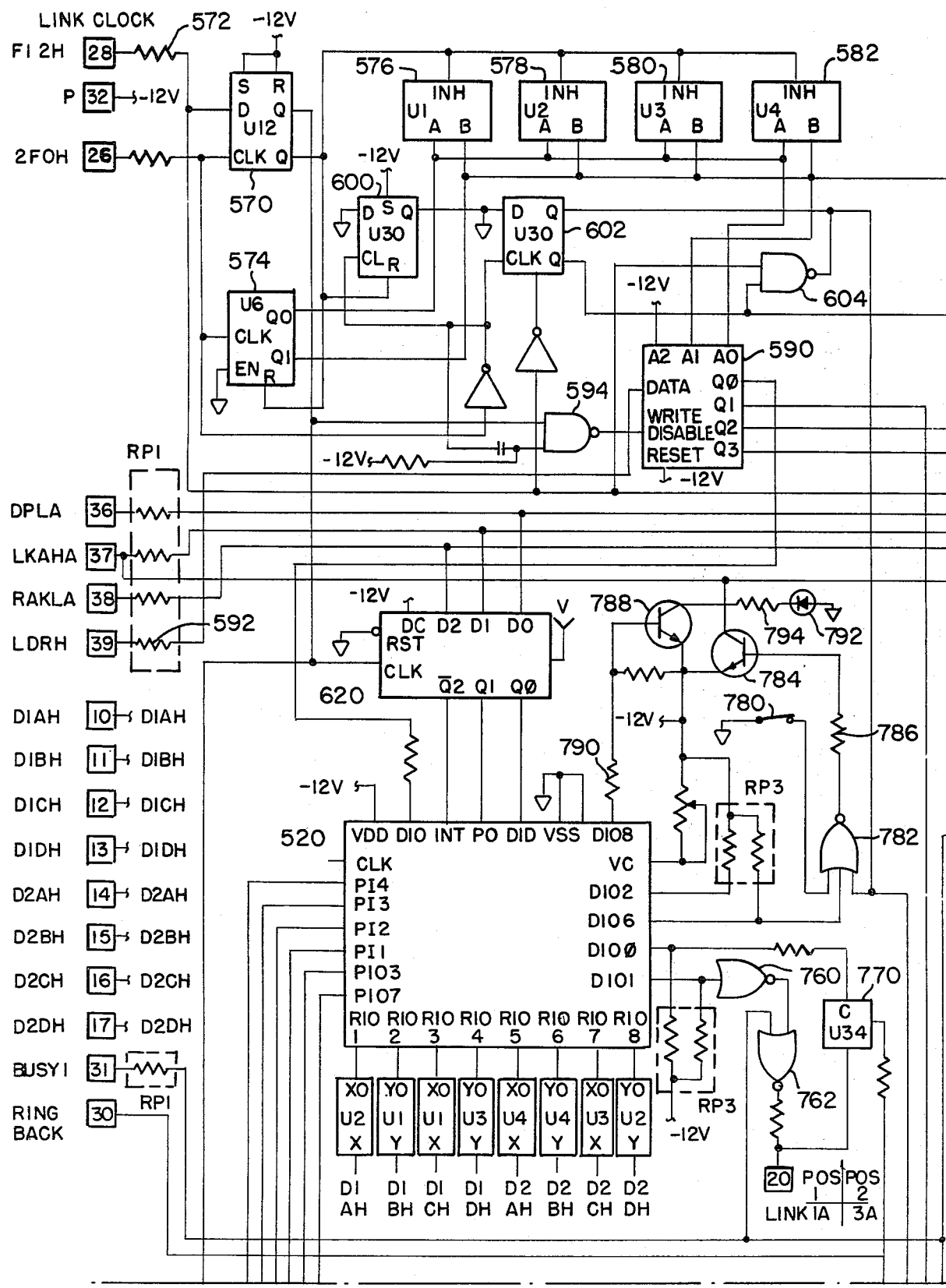
FIG. 16, including A and B, is a schematic of portions of the link controllers for four audio links.
Figure 16A:
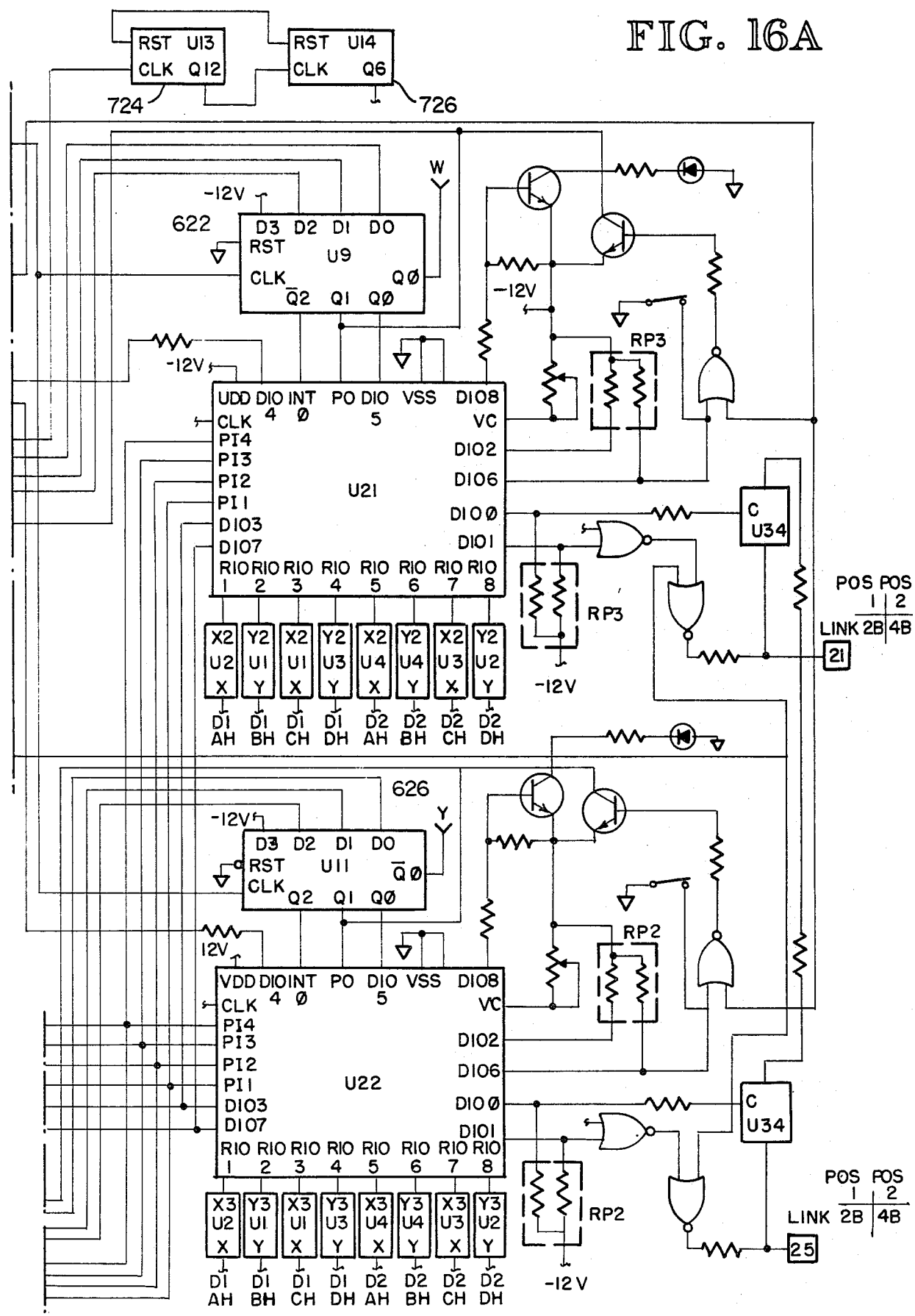
Figure 16A:
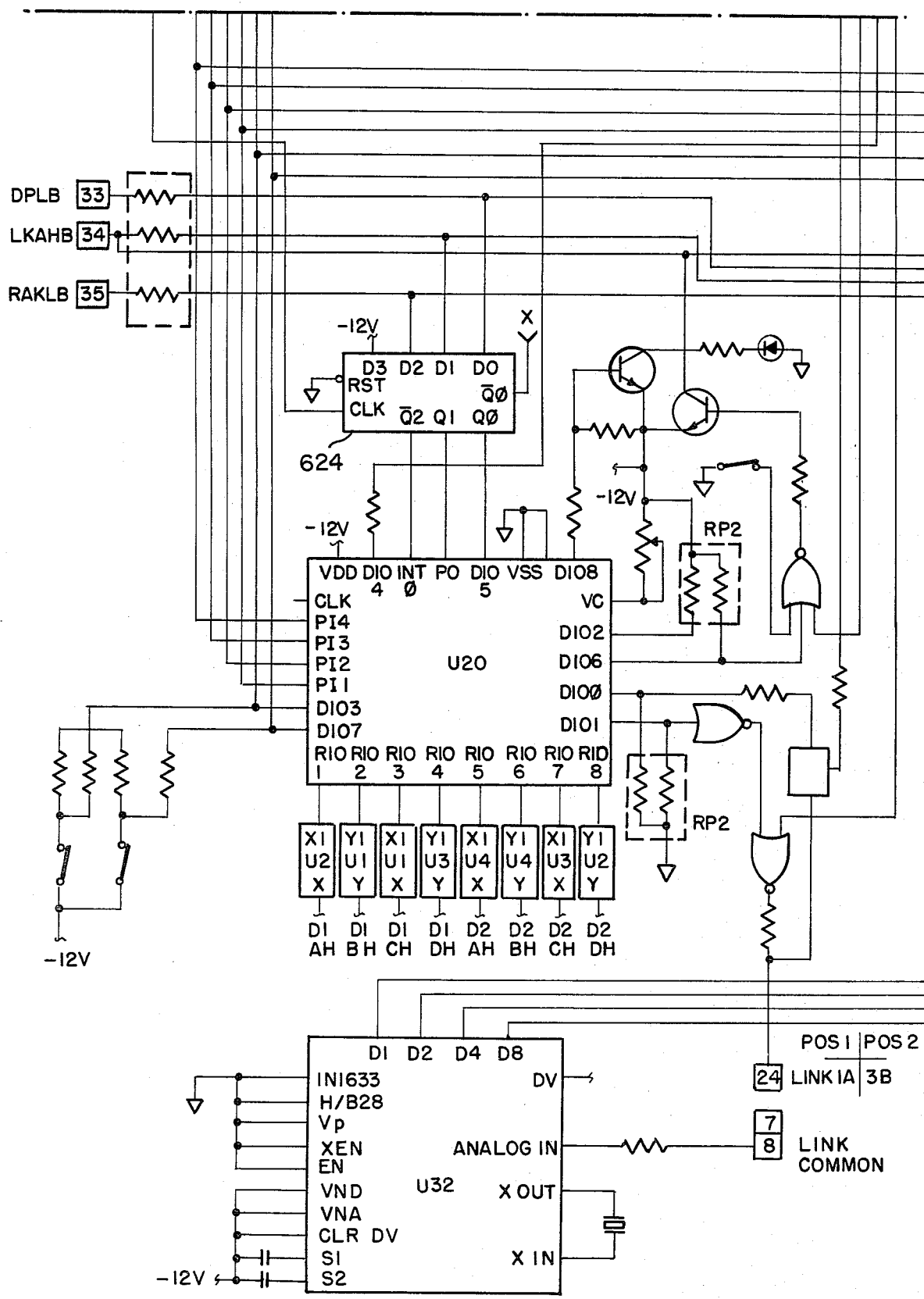
Figure 16B:
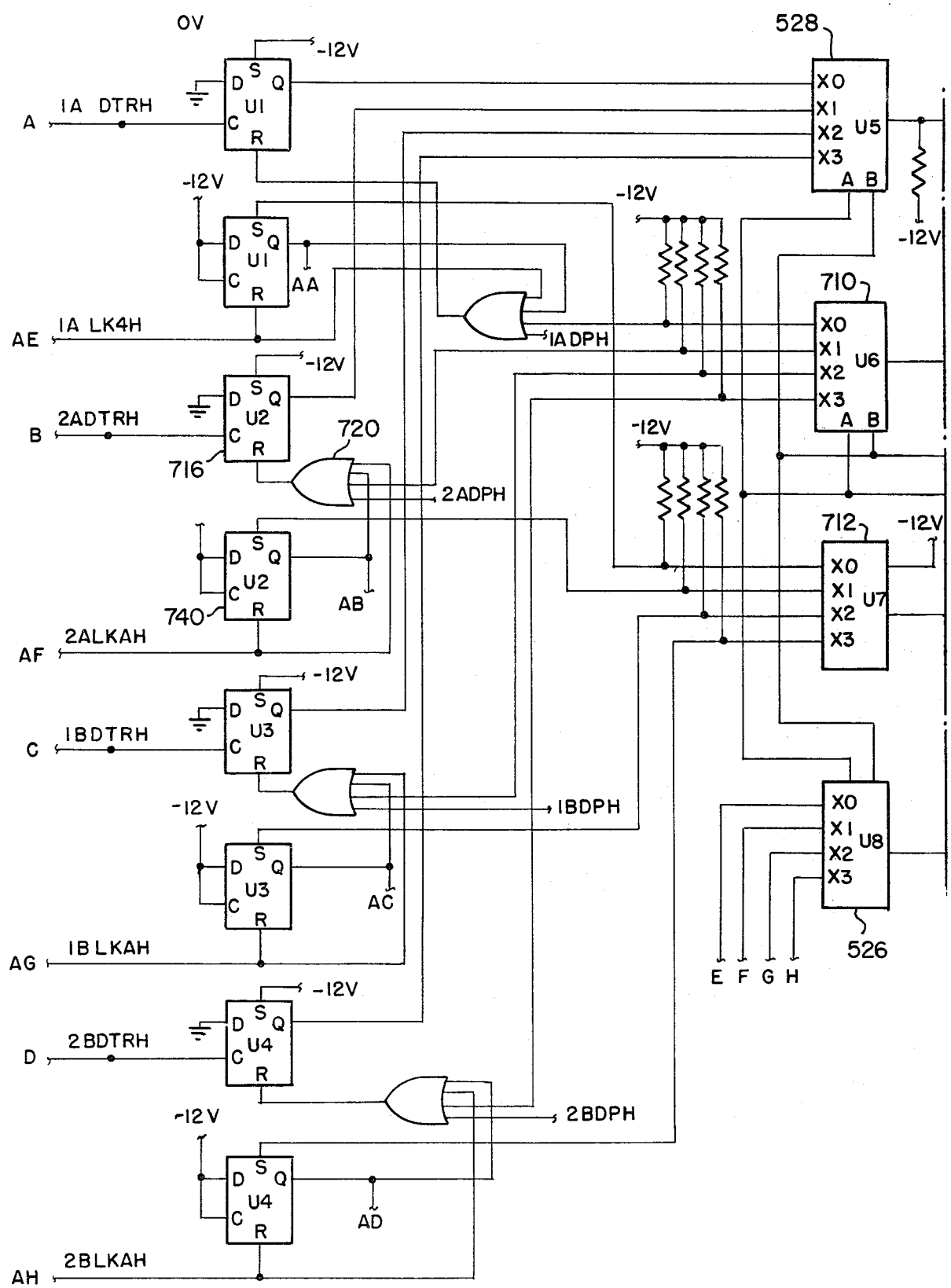
Figure 16B:
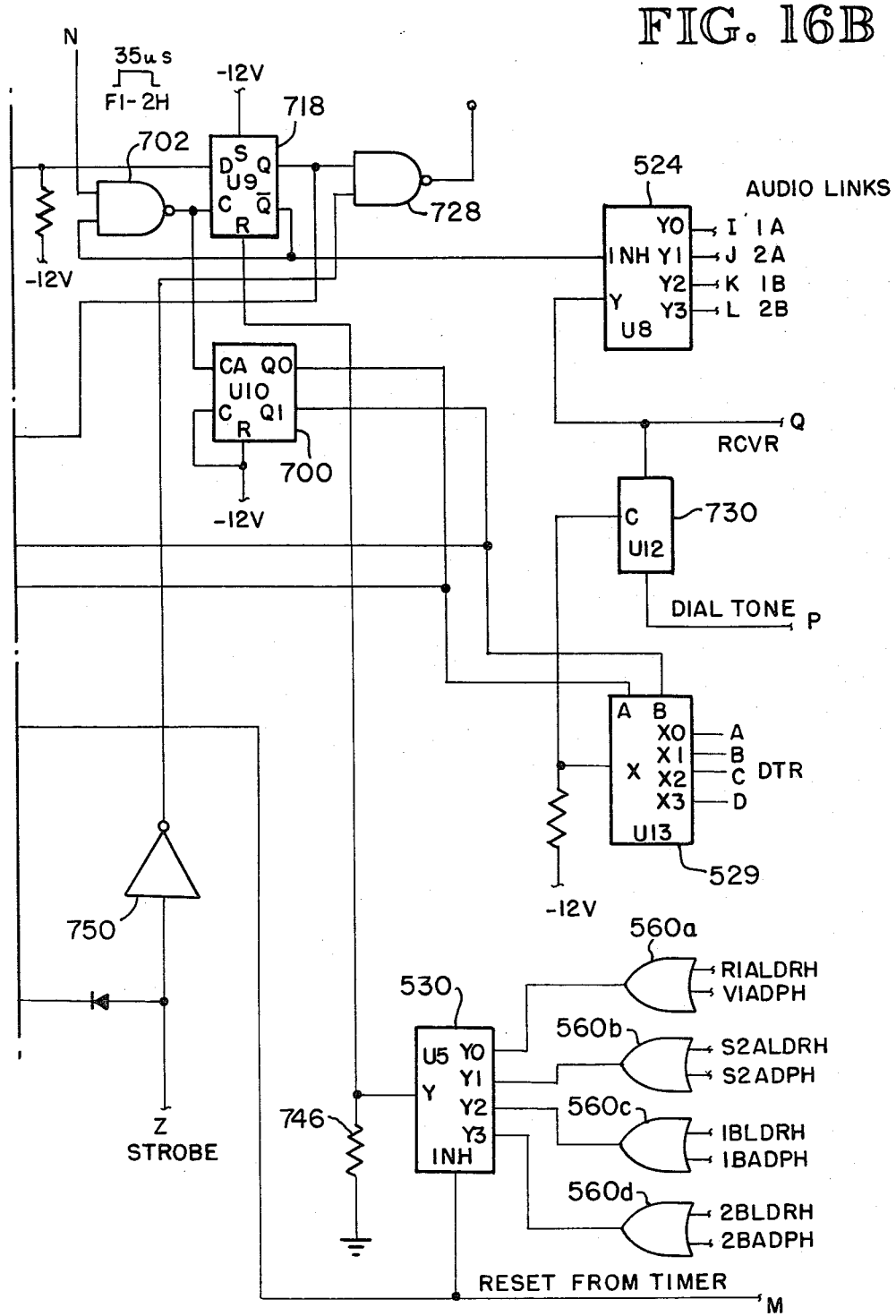
Figure 17:
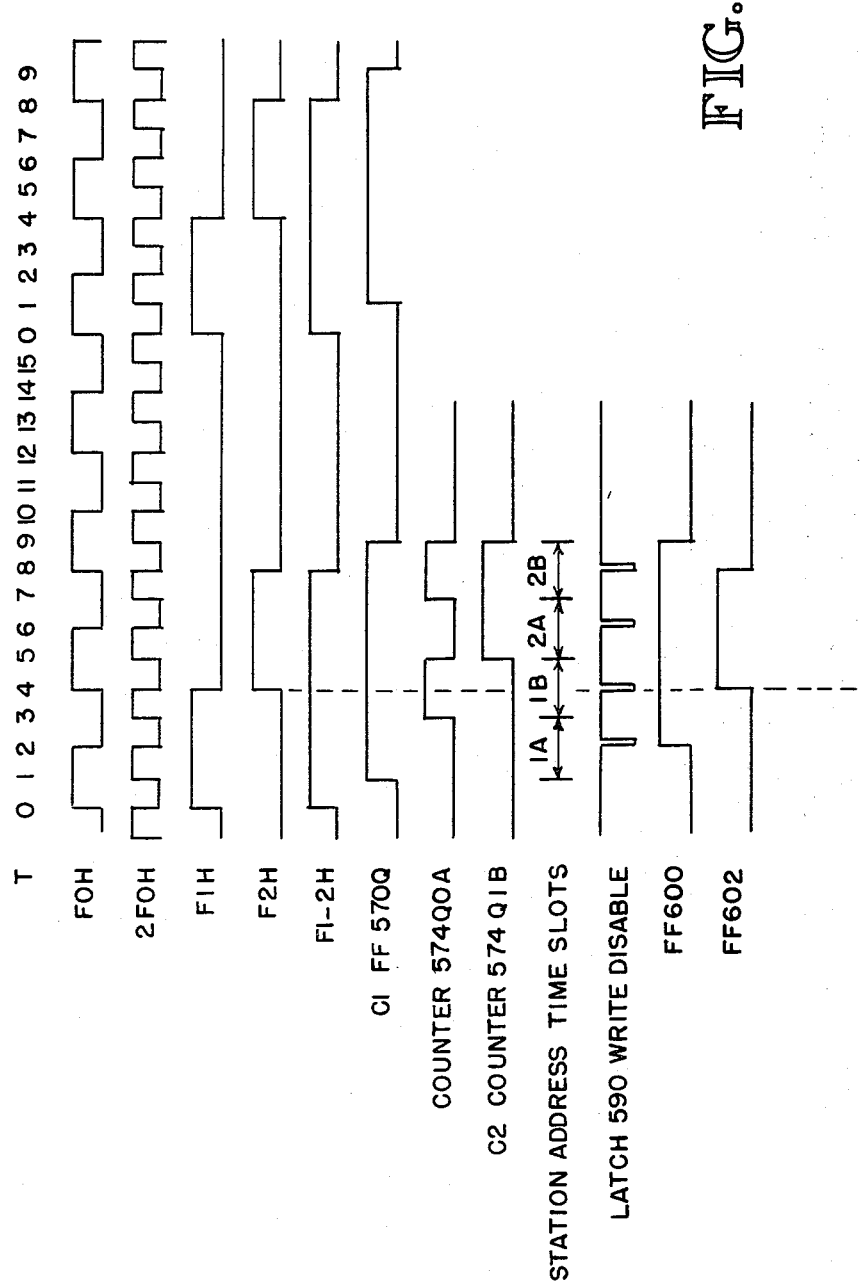
FIG. 17 is a timing diagram of signals used by the link controllers.

A block diagram for four link controllers 38 which control the operation of audio links 1A, 2A, 1B and 2B is illustrated in FIG. 15. Four additional link controllers 38 control the operation of audio links 3A, 4A, 3B and 4B. When the station controller 30 for a calling station finds an available link, it drives the LKAH bus low. Assuming that an "A" link is found to be available, LKAHA goes low during the link access period corresponding to the available link. Assuming that the available link is 1A, LKAH high during the first link access period is demultiplexed at 510 to continuously present a LKAH signal to a link controller circuit for link 1A which, as explained hereinafter, is primarily a microprocessor. The link demultiplexing signals C1 and C2 are generated by synchronizing clock generator 512 which is clocked by the clock frequency 2FOH and is timed by the signal F1-2H as illustrated in FIG. 17. C1 and C2 demultiplex DPH, LHAH and RAKL by clocking the demultiplexer 510 at T1 and T5. The same synchronized clock generator also generates the multiplexer control signal, A and B. These are binary control signals which control the station address multiplexer 570, 572, etc. The multiplexers serve to place the station address generated by the link controller circuits, 520, on the station address bus, 40, during the station address time slots as indicated in FIG. 17. Another synchronized clock generator 512 is enabled by F3-4H, the inverse of F1-2H, to control the demultiplexers 510 for links 3A-4B. The microprocessor 520 then generates a DTR1A output to indicate that a station is connected to the 1A link and is ready to dial a called station. A scanner control 522 driven by F1-2H causes a number of single pole, 5-throw switches 524, 526, 528, 530 and 532 to sequentially connect a single input or output line to one of several input or output lines. The primary purpose of the scanner is to allow four link controllers to share a single dual-tone multi-frequency decoder. Switch 528 sequentially scans the DTR outputs of the link controller circuits 520. As scanning continues, the switch 528 ultimately connects the DTR1A output of the link controller 520 to the scanner control 522 to stop the scan at a position corresponding to audio link 1A. Audio link 1A is then connected to a conventional multi-frequency tone decoder 540 through switch 524 which generates BCD data on four line bus 554 identifying the number corresponding to the tone combination on audio link 1A. Link controller circuit 520 then records the first digit in memory and waits for the second digit to be decoded by the decoder 540 and conveyed to the circuit 520 through bus 540. When the data are presented to the output of the decoder 540, the decoder 540 also generates a data valid strobe which is selectively coupled to only the link controller circuit 520 for the 1A link by the switch 526. Thus, even though the data from tone decoder 540 are transmitted to all link controllers 1A-2B, only the link controller circuit for the 1A link 520 responds to these date. This strobe signal also resets a call progress timer which frees the decoder 540 from a link if a number is not dialed within a predetermined period.

If the calling station is equipped with a conventional rotary dial mechanism, dial pulses DPLA or DPLB are applied to the link controllers 520, 521 or 523, 525, respectively, which counts the number of pulses for each digit to determine the address of the called station.

When the scanner control 522 stops scanning, a DTR1A signal is applied to a switch 527 through analog switch 529 to connect a dial tone to the audio link 1A indicating to the calling station that a station should be selected on its dialing mechanism.

As mentioned above, the link controller circuits 520, 521, 523, 525 for four links 1A-2B all utilize a single tone receiver 540. Consequently, it is desirable for the system to free the tone receiver 540 for use by other link controller circuits after it has been used by each link controller circuit to decode a called station address. Whenever the last digit has been dialed on a station connected to link 1A, 1ALDR goes high which is detected by OR gate 560 and applied to the scanner 522 through switch 530 to restart the scanning operation. Similarly, whenever a dial pulse is generated by a station controller, indicating that the station is not equipped with a dual-tone multifrequency dialing mechanism, 1ADPH goes high thereby applying a restart signal to scanner control 522 through OR gate 560 and switch 530.

The first and second digit addresses for the called station are presented to respective multiplexers 570, 572 which apply the address signals to bus 40 when the A and B outputs of the synchronous clock generator are both logic "0", which corresponds to link 1A. As explained above, the signal generator 42 then places appropriate signals on bus 44 to enable the station controller 30 for the called station during so that the called station connects itself to the 1A link. Although the link controller 38 has been explained only for link 1A, it will be understood that links 2A, 1B and 2B operate in the same manner. Links 3A, 4A, 3B and 4B also operate in a similar manner except that synchronized clock generator 512 and the scanner controller 522 receive F3-4H which is the inverse of F1-2H.

With reference now to FIGS. 16 and 17, it will be noted that there are eight links. Multiplexing for half of the links, 1A-2B, is done by four interconnected link controllers while multiplexing for the remaining four links is accomplished by four other interconnected link controllers. When F1-2H goes high, flip-flop 570 is enabled through resistor 572 which is clocked to the Q output by a 2FOH pulse at T1 (FIG. 17). Counter 574 is then enabled by the low at the Q output of 570 so that it is incremented by the 2FOH pulse train. Counter 574 is thus clocked through four states. After F1-2H goes low, flip-flop 570 is clocked low thus resetting the counter 574. The outputs of the counter 574 drive four multiplexers 576, 578, 580, 582 which apply the called station addresses at the outputs of link controllers 520 to the bus 40 during the station addresss valid periods of each link access period corresponding to the eight links. It should be mentioned that the outputs of counter 574 are the A and B outputs of the synchronized clock generator, 512, of FIG. 15. Note that the system clock FOH leading edge at T4 occurs in the middle of the pulse from the QO output of flip-flop 574. This signal coincides with the station address valid periods shown in FIG. 5 since it is this signal which gates the station addresses onto the bus 40.

LDRH signals from the signal generator 42 are multiplexed in the same time slots as the address signals for the called station. Thus, LDRH for link 1A occurs during the link access period for link 1A. The multiplexed LDRH bus is applied to the data input of latch 590 through resistor 592. Sampling pulses developed by NAND gate 594 are applied to the write disable input of the latch 590. The multiplexed LDRH signal for link access periods 1A, 1B, 2A, 2B are applied to the outputs of latch 590 at Q0, Q1, Q2, Q3. It should be mentioned that latch 590 and associated circuitry correspond to the demultiplexer 532 of the block diagram of FIG. 15.

The DPL, LKAH and RAKL signals are multiplexed on their respectives buses so that they only occur during the link access period corresponding to the link to which the calls or calling station is connected. These periods are F1 and F2 in FIG. 17. These signals for the "A" audio links are demultiplexed at 620, 622 and for the "B" audio links by demultiplexers 624, 626. Thus, whenever, for example, a ring acknowledgment is produced by a call station connected to the 1A bus a demultiplexed RAKLA signal from demultiplexer 620 is continuously presented to the microprocessor 520.

As explained above, the link scanner looks for a dial tone request from the link controller circuits 520, 521, 523, 525 (FIG. 15). When it notes a DTR high, it connects the audio link which is associated with the link processor circuit generating the DTR signal to the tone decoder 540. The rone receiver is disconnected and scanning is resumed if 10 seconds pass without the calling station dialing, rotary dial pulsing or hook flash is received, the calling station hangs up or a dual tone multi-frequency dialing sequence is completed. A scan counter 700 (corresponding to scanner control 522 of FIG. 15) is clocked by F1-2 from enabled NAND gate 702. It then causes the switches 524, 529, 530, 526, 528, 710, 712 to sequence through each of their four positions. Thus, if a dial tone request DTR is generated by link 2A, flip-flop 716 is clocked high. When counter 700 is in the one state, switch 528 passes the high from flip-flop 716 to the data input of flip-flop 718. Since counter 700 is clocked on the negative edge while flip-flop 718 is clocked on the positive edge, flip-flop 718 is clocked high one-half of a clock cycle later. The low at the Q output of flip-flop 718 thus disables NAND gate 702 so that counter 718 no longer increments from being clocked by F1-2H. The high at the Q output of flip-flop 718 is fed through switch 710 to OR gate 720 which resets flip-flop 716. However, the logic low at the Q output of flip-flop 718 continues to disable NAND gate 702. Thus, the scanner stays locked in counter 700 01 position until flip-flop 718 is subsequently reset as explained hereinafter. Flip-flop 718 causes switch 524 to connect the tone receiver to audio link 2a. Dial tone is also applied to audio link 2A by switch 529 and 730 whenever a dial tone request DTRA is received.

The logic high clocked to the Q output of flip-flop 718 produces a logic low at the reset terminals to counter 724, 726 through enabled NAND gate 728 permitting the counters 724, 726 to increment. After 10 seconds the Q6 output of counter 726 goes high thereby resetting flip-flop 718 to resume scanning, and set flip-flop 84- through switch 712. If flip-flop 740 is set, a busy signal is applied to the audio link as explained hereinafter and future dial tone requests would be inhibited by a logic high applied to OR gate 720 which would maintain flip-flop 716 reset.

Each time the tone receiver 540 (FIG. 15) decodes a dual tone multifrequency dialing input, a strobe signal is generated which is applied to the appropriate link controller circuit 520 through switch 526. The strobe pulse is also inverted at 750 and applied to the reset terminals of the counters 724, 726 through NAND gate 728, thereby reinitializing the 10-second timeout. Thus, as long as the calling station dials a number within 10 seconds after a dial tone request is received at flip-flop 716, the scanning circuit remains set to the 2A link. If, however, a number is not dialed within 10 second, scanning resumes.

After the dialing sequence is completed, a 2ALDRH signal is generated by the signal generator which resets flip-flop 718 through OR gate 560b and switch 530. The reset terminal to flip-flop 718 is normally held at logic high since resistor 746 is connected to ground. Scanning thus continues until another dial tone request DTRH is received. If the scanner is stopped, a hook flash, hangup or rotary dialing pulse will also reset flip-flop 718 and restore scanning responsive to a signal generated by the microprocessor. The circuitry for audio links 1A, 1B and 2B operate in the same manner as the circuitry for audio link 2A.

NOR gates 760, 762 control the application of a busy tone to link "A", and identical circuits to other links apply the busy signal to those links. NOR gate 760 enables NOR gate 762 whenever 10 seconds have elapsed since a number is dialed by a calling station. NOR gate 762 is also enabled by an output of processor 520 through NOR gate 760 whenever a station connected to a given link is busy. Analog switch 770 connects the RINGBACK signal to the audio link under the control of processor 520 whenever a ring acknowledge is transmitted by the called station. Other equivalent groups of components have performed similar functions for other links.

The link controller microprocessor 520 is reset by the demultiplexed LKAHA signal on its P0 pin. Thus, the circuit 520 is reset when the link with which it is associated is not accessed.

The system also includes circuitry for causing a given link to simulate busy to facilitate testing of other links. Opening a busy out switch 780 when the link is not being accessed by a station generates a logic high at the output of NOR gate 782 which saturates transistor 784 through resistor 786 during the link access period corresponding to that link. Since the collector of transistor 584 is connected to the LKAHA buss, LKAHA will be pulled low during the link access period, thus simulating that the link is already connected to a station. Circuit 520 then assumes that its link is busy and it causes transistor 788 to periodically saturate through resistor 790 thus periodically illuminating LED 792 through resistor 794. Thus, if one desires to test the link controller for link 1B, all busy out switches except one for link 1B are opened so that the only available link is link 1B.

Figure 18:
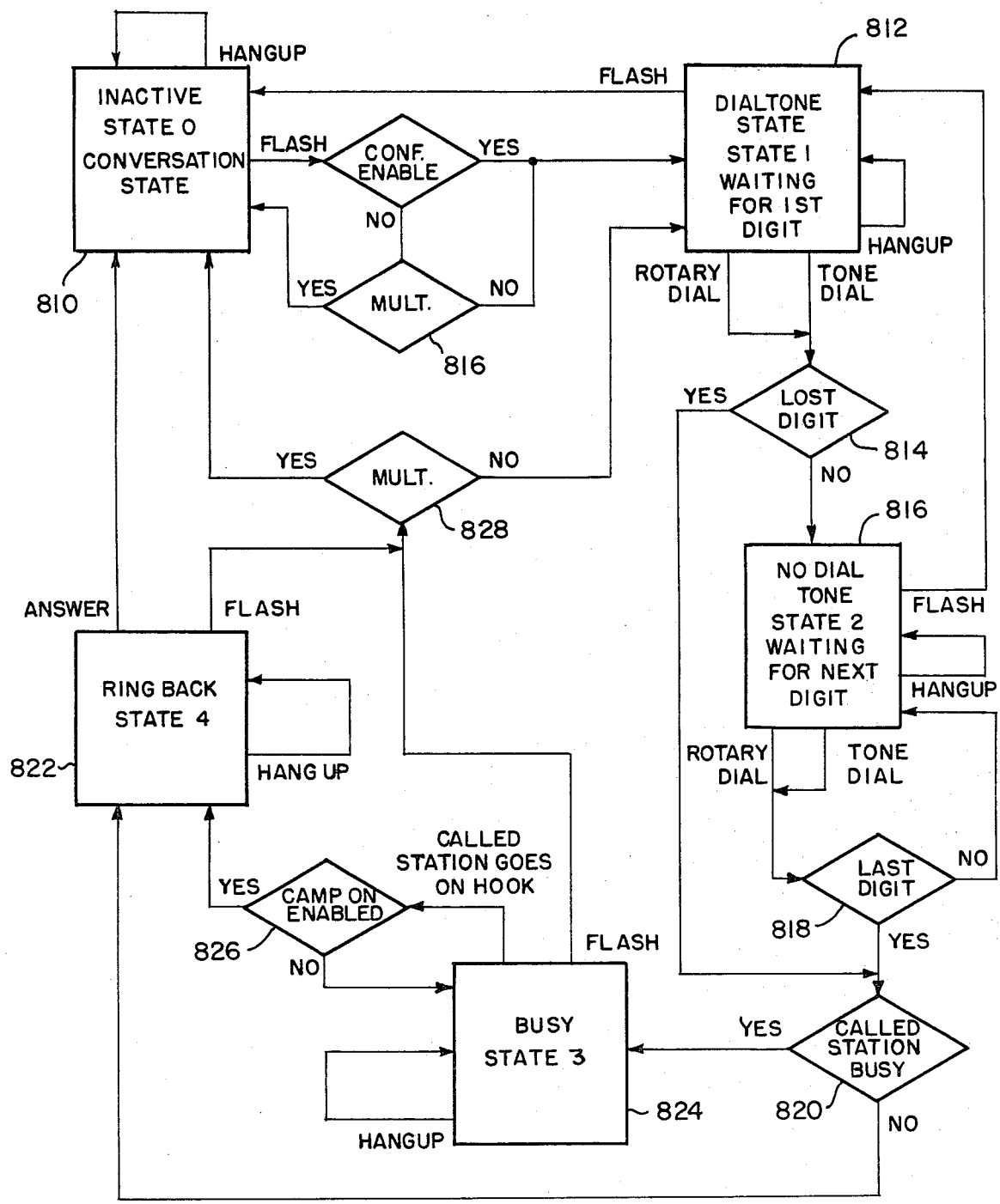
FIG. 18 is a flow chart summary for the program illustrating the operating sequence of a microprocessor used by each link controller.
Figure 19B:
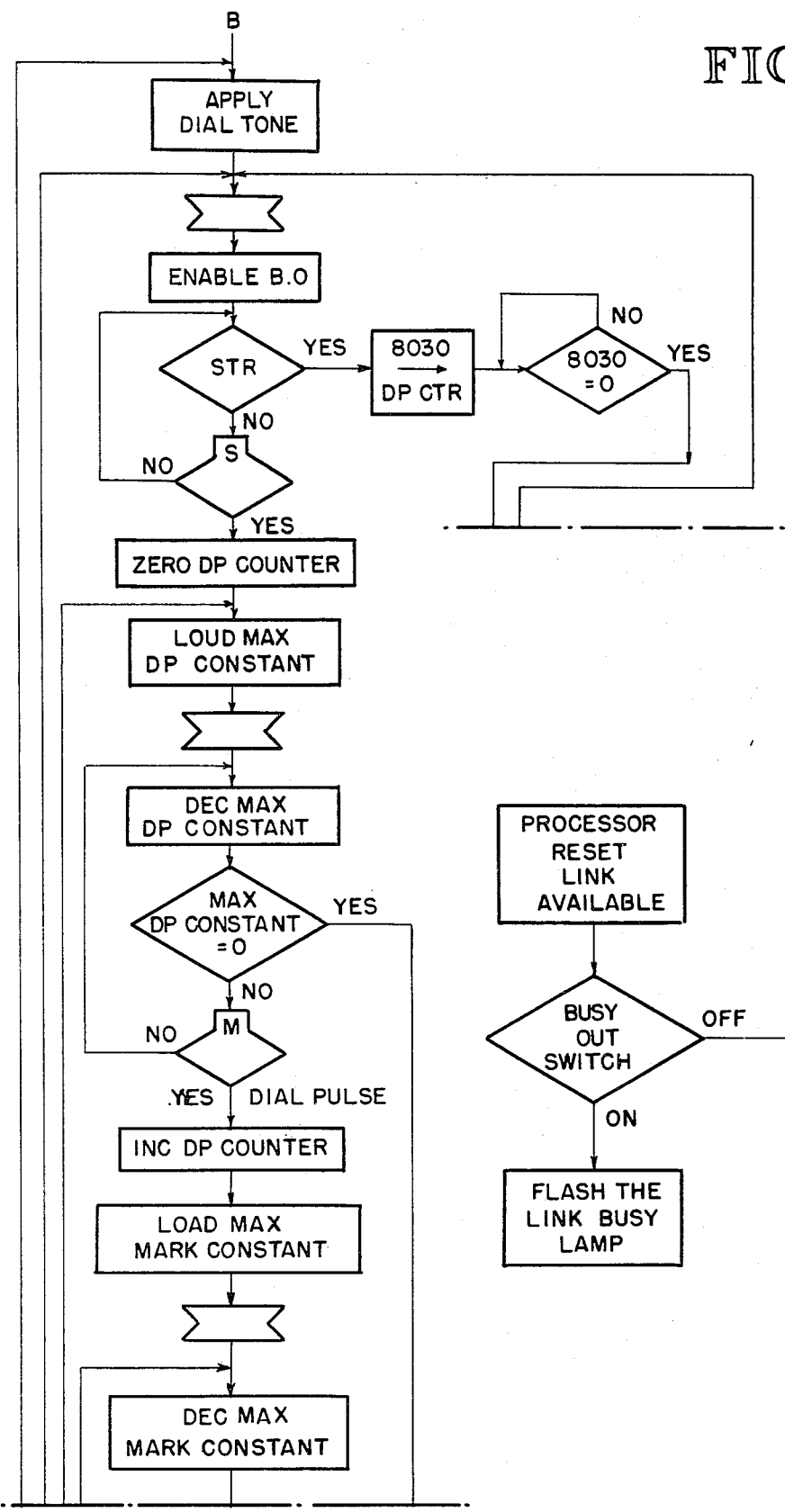
FIG. 19, including A-C, is a flow chart of the computer program for the link controller microprocessor as illustrated in FIG 18.
Figure 19A:
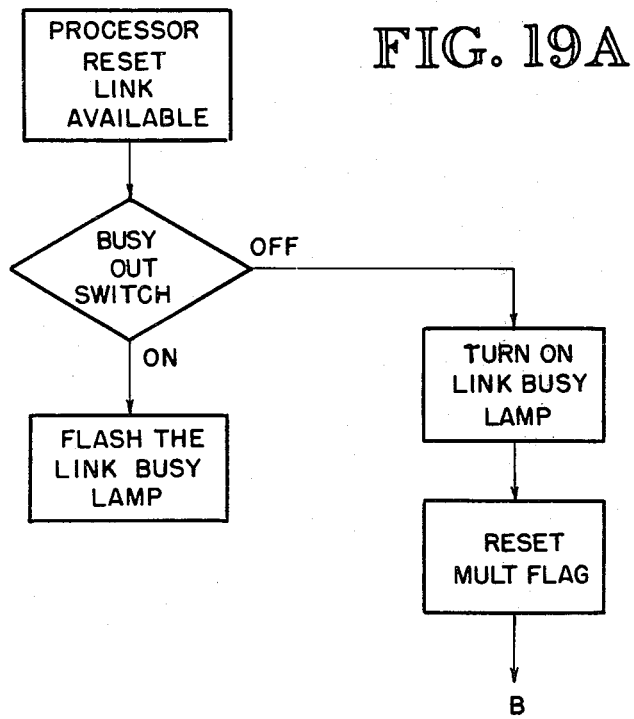
Figure 19B:
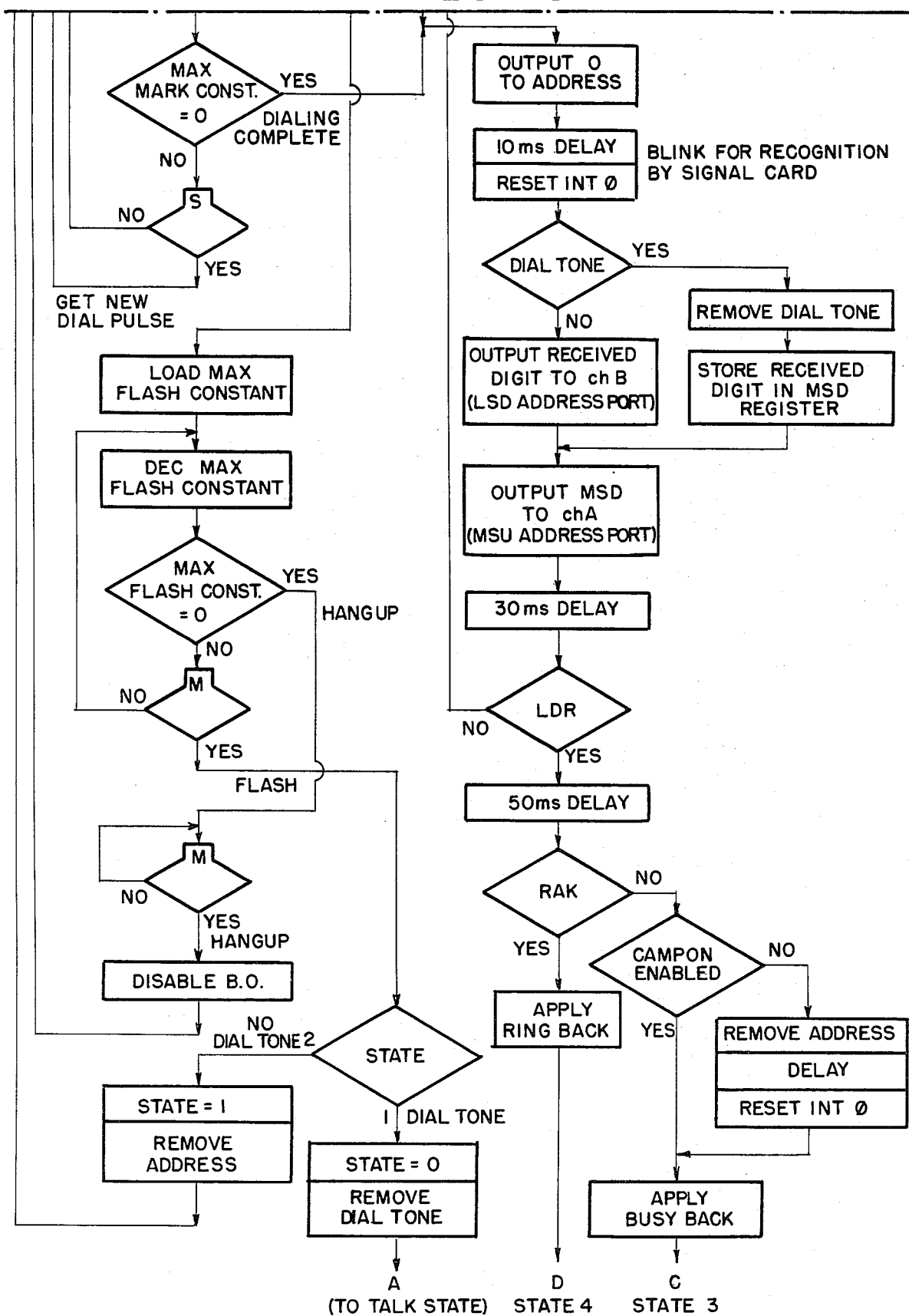
Figure 19C:
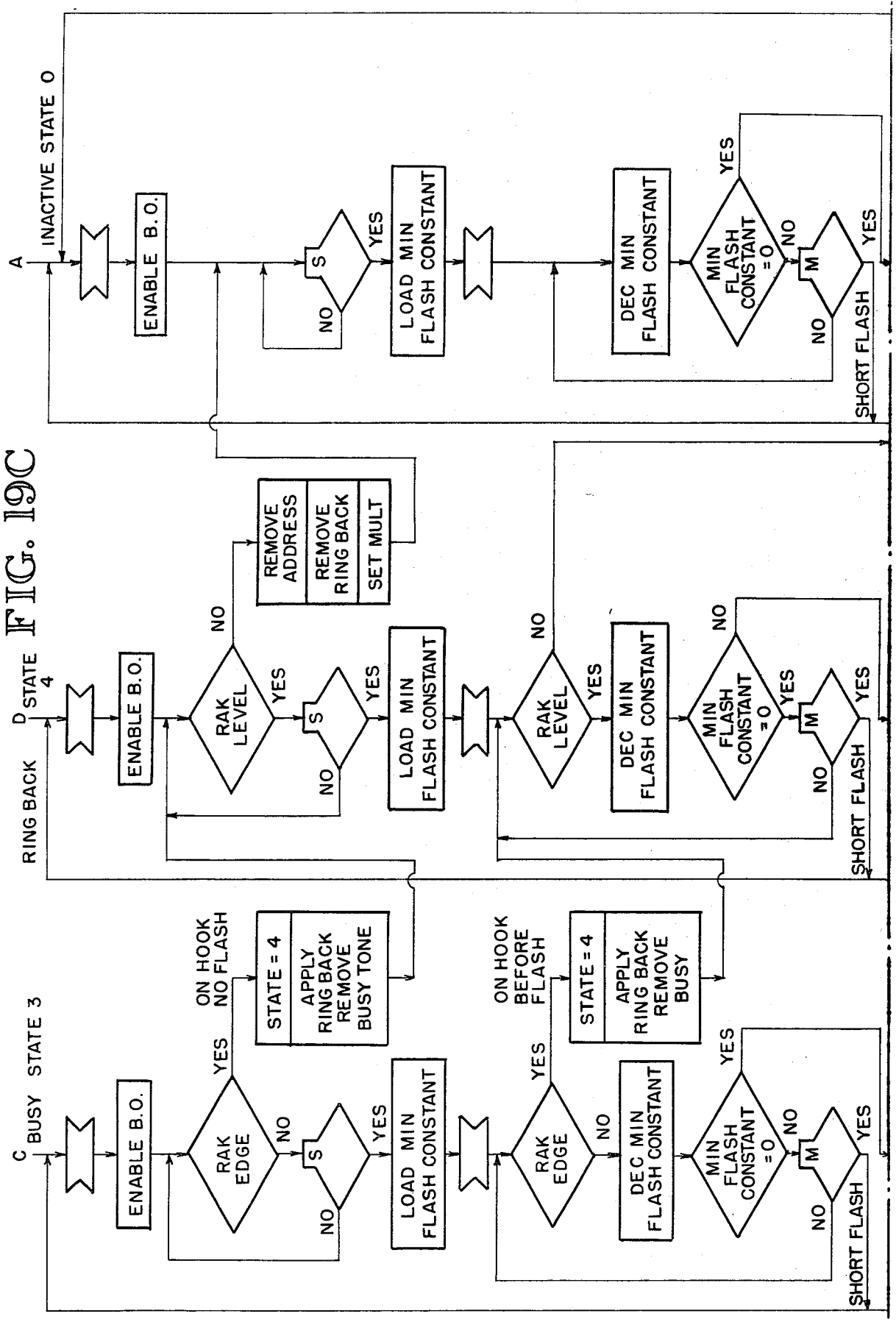
Figure 19C:
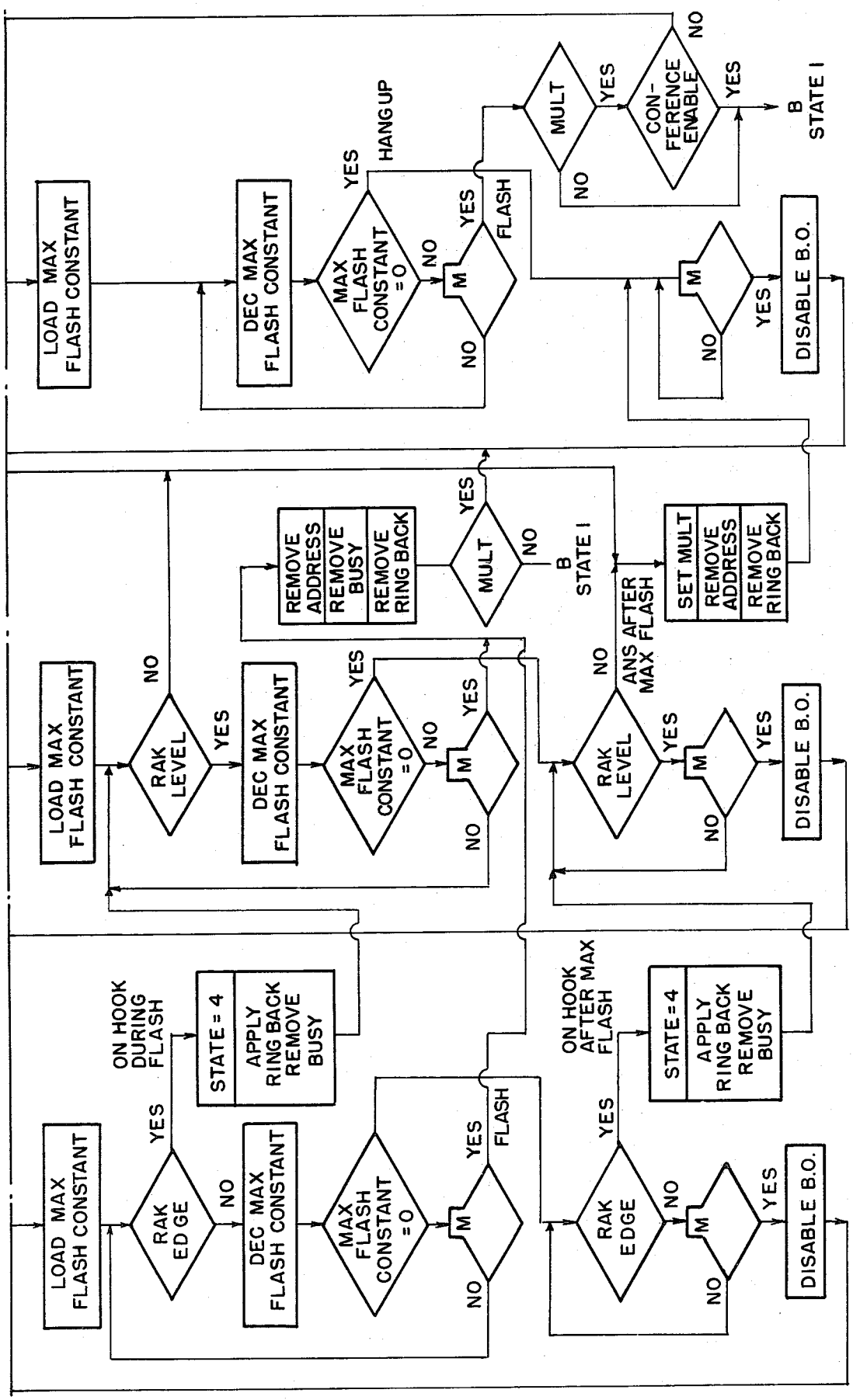

A summary flow chart for the operation of the link circuit microprocessor 520 is illustrated in FIG. 18. When a station accesses the link, the microprocessor comes out of reset and is initially in the dial tone state "1" at 812.

The system can leave the dial tone state "1" in a number of modes. The system can be flashed from the dial tone state "1" to the inactive state "0". Generally, however, the system leaves state "1" by either actuating the rotary dialing mechanism or the tone dialing mechanism. After each digit is dialed, the system determines whether that digit was the last to be dialed at 814. On all digits but the last digit the system then enters state "2" at 816 in which it waits for another digit to be dialed. When the next digit is dialed, the system determines whether that digit was the last digit to be dialed at 818 and, if not, remains in state "2" at 816.

When the last digit is dialed, the system determines whether the called station is busy at 820. If the called station is not busy, the system enters the ringback state "4" at 822 in which a ringback tone is transmitted to the calling station and a ring is produced at the called station. If the called station is busy, the system enters BUSY state "3" at 824. If a "camp-on" switch has been actuated, the system will automatically transition to the ringback state "4" at 822 when the called station is no longer busy. If the camp-on feature has not been enabled, the system returns to state "3". Thereafter, state "3" can be left only by hanging up or by generating a hook flash which either returns the system to state "0" or state "1" depending upon whether more than one station is found to be on the link at 828. Thus, if two stations are conversing on the same link in state "0" and one of the stations flashes to enter the dial tone state "1", and, then, after the called station is dialed, the station is busy, the system can be flashed out of state "3" back to state "0" so that two-way communication between the two stations can once again occur. However, if only one station is on the line, the system transitions to dial tone state "1" so that either another station can be dialed or the calling station can go on-hook to return to state "0".

The system leaves ringback state "4" in one of three modes. First, the called station can answer, in which case the system returns to the inactive state "0" to allow two-way communication between the calling and called stations. Alternatively, the calling station can produce a hook flash. If it is determined at 828 that there are two stations on the link, the system returns to the inactive state "0" so that two-way communication between the two stations can occur. If only one station is on the link, the system transitions to dial tone state "1" at 812 so that the calling station can call a different station.

Operation in the inactive state "φ" is described as follows: If a conference enable switch has been activated, the system will transition to a dial tone state at 812 whenever a hook flash occurs in state 810. If the conference enable feature has not been enabled and there is more than one station connected to the link, the system returns to the inactive state at 810. This is because conference enable has not been actuated indicating that only two stations may be on a link at the same time. If it is determined that two stations are, in fact, on the link at 816, then the system should return to the inactive state 810 to allow two-way communication between the two stations. If, however, only one station is on the link, 816 transitions the system from state "0" to state "1" at 812. Thus, if two stations are communicating in state "0" and conference enable is set, the dial tone state may be accessed by generating a hook flash. Otherwise, the dial tone state can only be entered at 812 when one station is on the link.

If a station hangs up in any state, the system will remain in that same state. If, however, that station was the last to hang up, LKAH will go high, thus resetting the microprocessor, so that when the link is again accessed, the system will begin operation in the dial tone "1" state, 812.

A flow chart for implementing the flow chart summary of FIG. 8 is illustrated in FIG. 19. The flow chart requires fairly straightforward programming to generate appropriate instructions depending upon the specific model microprocessor employed. Such programming task can easily be accomplished in under six man-months.

Figure 20:
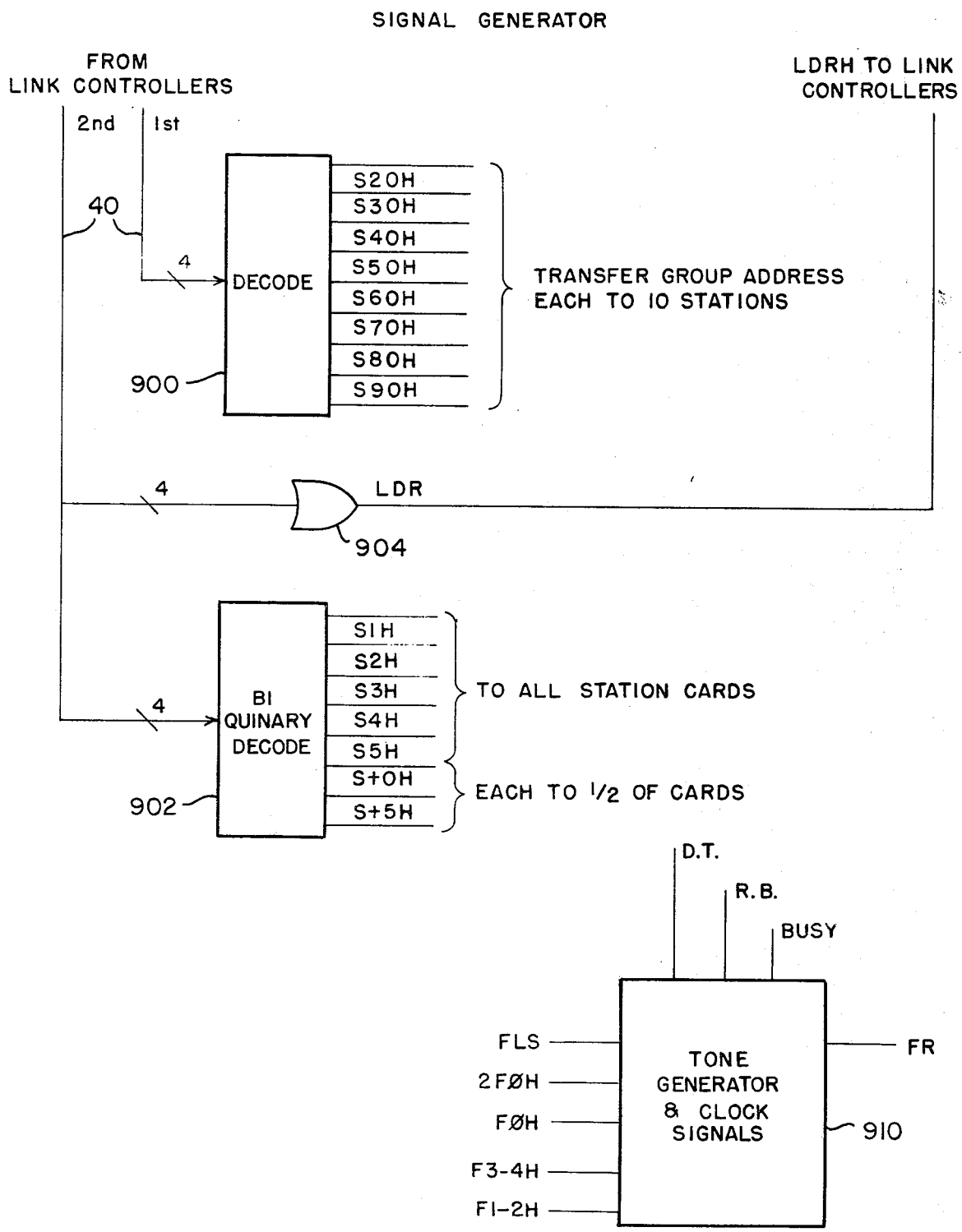
FIG. 20 is a block diagram of the signal generator for decoding station addresses and generating various signals utilized by the station controllers and link controllers.

A block diagram of the signal generator 42 (FIG. 1) is illustrated in FIG. 20. Basically, the signal generator decodes dual-tone multi-frequency dialing signals from the link controllers 38 and it generates a number of signals which are used by the remainder of the system. The address of the called station for the first digit is conveyed to a decoder 900 via a four line bus 40 (FIG. 1), and the second digit of the called station is connected to a second decoder 902 and to an OR gate 904 through four line bus 40. As explained above in reference to FIG. 15, the addresses of the called station for the first and second digits are time multiplexed. Thus the signals on bus 40 during a given link access period are generated by the station connected to the link corresponding to that access period. Decoder 900 converts its binary input to turn on one of eight output lines designated S20H-S90H and generalized to be SXXH. Decoder 902 is a bi-quinary decoder in which its BCD input actuates one of five lines S1H to S5H and either S+0H or S+5H depending upon whether the outputs S1H-S5H designate the low order numbers of a digit or the high order numbers of a digit. Thus, if the second digit is 8, S+5H and S3H go high whereas if the second digit is 2, S+0H and S2H go high. The S+0H and S+5H lines are designated in the station controller schematics as S+XH whereas the S1H-S5H outputs are specifically identified. OR gate 904 determines when a second digit is received to generate an LDR pulse which informs the link controllers that the last digit has been received by the signal generator. The LDR signal is, of course, time multiplexed so that it provides last digit information to all of the link controllers. LDR could be generated after any number of digits to provide for special dial codes or greater length codes for equipment sizes greater than 80 stations.

The signal generator 42 also includes a tone and clock generator 910 which has an internal clock and generates BUSY, RINGBACK and DIAL TONE signals which are selectively applied to the audio links as explained above, various clock signals FLS, 2F0H, F0H, F1-2H and F3-4H which are shown in the timing diagrams of FIGS. 5 and 17. The circuit 910 also generates a ring frequency signal $F_R$ which is utilized as explained above.

Figure 21A:
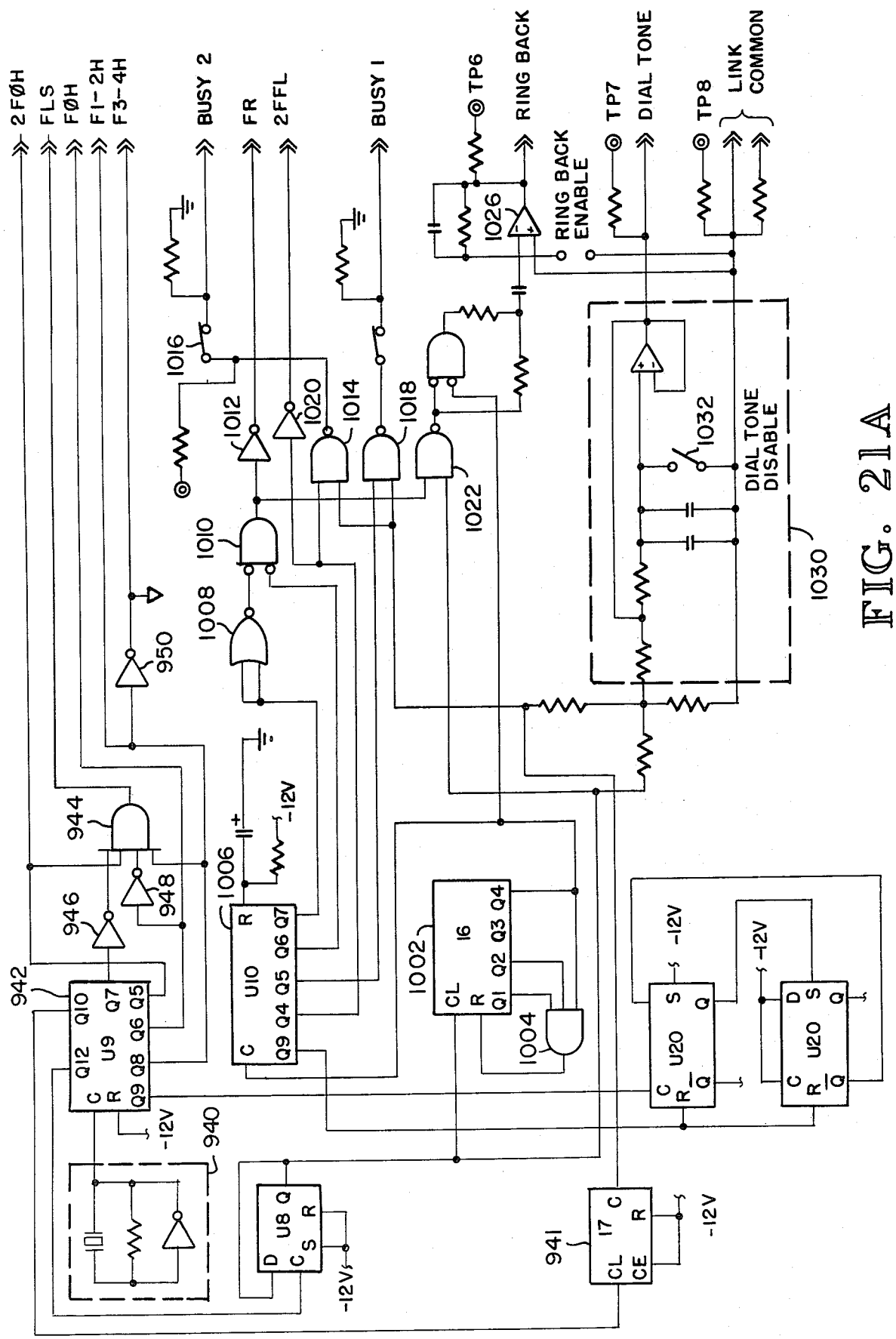
FIG. 21, including A and B, is a schematic of the signal generator of FIG. 20.

Additional details of the signal generator are illustrated in the schematic of FIG. 21. The system includes a 3.59 mHz clock circuit 940 which drives a 12-stage, divided by 4094 counter 942. Various outputs of the counter 942 are used to generate 14, 56 and 112 kHz outputs. 2F0H is taken directly from the 112 kHz output and F0H is produced directly from the 56 kHz output. FLS is generated by decoding other outputs by AND gate 944 through inverters 946, 948. FLS is a relatively short synchronizing pulse which occurs once every F0H pulse. F1-2H is produced directly from the 14-kHz output of counter 942 while F3-4H is produced by inverter 950 as its inverse.

As explained above, the time multiplexed first digit signals from the link controllers are applied to decoder 900 through resistors 960. The bus 40 over which the signals are received is normally held low by resistors 962.

Similarly, time multiplexed second digits are coupled to decoder 964 through resistors 966. These lines are floating, but normally held low by resistors 968. Decoder 964 is identical to decoder 900, but other circuitry causes it to act as a by-quinary decoder. Accordingly, S1H is produced by AND gate 960 whenever decoder 964 decodes either 1 or 6 (1+5) the remaining OR gates 972-978 function in a similar manner except that OR gate 978 produces an S5H output whenever a binary 0 or 5 is decoded by NOR gate 960 and NAND gate 982. S+5H high is produced by OR gate 984 and 986 whenever the high order bit of the binary input to decoder 964 is high or the six or seven outputs of decoder 964 are high. Otherwise, a low S+5H causes NOR gate 988 to generate S+0H whenever decoder 964 does not decode a zero.

The signal generator also produces a BUSY 1 output which is applied to a link when a station is busy. A BUSY 2 output which is applied directly to the station controllers whenever all of the links are busy. Accordingly, a 440 Hz output of counter 1000 clocks counter 1002 which generates a 40 Hz output since the Q1, Q2 and Q4 outputs are applied to AND gate 1004, the outputs of which reset counter 1002. The 40 Hz output of counter 1002 is further divided by counter 1006 and specific outputs of counter 1006 are combined by NOR gate 1008, 1010 and inverted by inverter 1012 to produce FR which actuates a ringer 12 in the called station 10. Outputs from counter 1006 are also applied to NAND gate 1014 to generate a system busy output FB if system busy tone enable switch 1016 is closed. The system busy output FB is a 350 Hz tone having a 2 Hz interruption rate. The busy signal BUSY1 for a station busy is also a 350 Hz tone generated by NAND gate 1018, but its interruption rate is 1 Hz, half that of the system busy signal FB. A 2FFL signal is also generated by inverter 1020 which has the same frequency as the system busy repetition rate.

The 0.8 second on, 2.4 seconds off signal generated by NOR gate 1010 also gates a 440 Hz signal through NAND gate 1022 which is combined with a 40 Hz signal by NOR gate 1024 and amplified and filtered at 1026 to produce a RINGBACK signal which is heard by the calling station when the called station is not busy. Under some circumstances it is not desirable for the calling station to receive a RINGBACK in which case ringback enable switch 1028 is closed.

The signal generator also produces a dial tone by combining a 350 Hz signal from counter 941 and the 440 Hz signal from counter 1000. These signals are applied to a dial tone amplifier and filtering circuit 1030 which produces a DIALTONE which is applied to the link to which a calling station is connected when an available link is seized. Under some circumstances it is not desirable for the calling station to receive a dial tone, in which a dial tone disable switch 1032 is closed.

The inventive system has been described herein as utilizing two self-contained controller circuits for each station, each connectable to four audio links, in order to access eight links. It will be understood, however, that the inventive concept applies to the use of more than two controller circuits in each station controller to expand the number of links in the system. Also, two or more self-contained controller circuits which are connectable to more than four links may be used to expand the number of links in the system.

We claim:

1. A telephone intercom system comprising a plurality of self-contained station controllers each adapted to connect a respective telephone station to one of M audio links to make or receive a telephone call, and each having an operating cycle of M equal operating periods during which a calling station controller searches for and then connects itself to a corresponding available audio link and a called station receives an enabling signal derived from a station address generated by the calling station and connects itself to the audio link to which the calling station is connected, said system including means for allowing N of said system controllers to operate in parallel for each station to selectively connect said station to one of M×N audio links, each of said audio links being controlled by a respective link controller which receives the station address of the called station from the calling station, decodes the address and applies the address in time-multiplexed form to a plurality of demultiplexers associated with the respective stations during one of N address valid periods of the M operating periods corresponding to the one of M×N audio links to which the calling station is connected to allow the demultiplexer for the called station to decode said time division multiplexed address and apply said enabling signal to the one of N station controllers corresponding to the one of N address valid periods of said operating period.

2. The system of claim 1 wherein each of said stations employs two of said station controllers operating in parallel, and each of said station controllers are connected to four audio links such that any one of said stations may be connected to one of eight audio links.

3. The system of claim 1 wherein the N address valid periods corresponding to the respective N station controllers of each station are sequentially applied to said demultiplexer, and wherein said demultiplexer further includes processing means for presenting an enabling signal resulting from the station address to the one of N station controllers corresponding to said address valid period at the same time that said enabling signal would be presented to the remaining N−1 station controllers for the remaining N−1 address valid periods, such that said station controllers are enabled at the same portion of each operating cycle regardless of which audio link said calling station is connected.

4. The system of claim 3 wherein said processing circuit includes first decoding means for producing said enabling signal responsive to a station address designating the station to which said station controller is connected during each of N address valid periods of each operating period, the output of said decoding means being applied to the N station controller for said station and to memory means for storing each enabling signal produced during the first through N−1 data valid periods of said operating period and presenting each of said stored signals to a corresponding one of N−1 station controllers for the called station, and switch means for simultaneously clocking the output of said decoder means into the N station controller and the N−1 outputs of said memory means into the respective N−1 section controllers.

5. The system of claim 1 wherein said system further includes a link control bus which is in one of two states during each of said M operating periods to indicate the availability of each of M corresponding audio links, and wherein said station controllers search for an available link by examining said link control bus during M operating periods, said system further including busy out means for selectively making each of said links unavailable to facilitate testing of other links.

6. The system of claim 5 wherein said busy out means place said link control bus in a busy state during each operating periods corresponding to the links which are to be made unavailable.

7. A telephone intercom system comprising:

a plurality of stations each controlled by a first self-contained station controller adapted to connect said respective telephone station to one of four audio links in a first set and a second self-contained station controller adapted to connect said telephone station to one of four audio links in a second set to make or receive a telephone call, said station controllers having an operating cycle of four equal operating periods corresponding to the four audio links of each set during which a calling station controller searches for and then connects itself to a corresponding available audio link and the called station receives an enabling signal derived from a station address generated by the calling station and connects itself to the audio link to which the calling station is connected;

a link controller associated with each of said audio links, said link controllers receiving the station address of the called station from the calling station connected to the associated link, decoding the address and outputting the address in time-multiplexed form during one of two address valid periods of the operating period corresponding to the audio link to which the calling station is connected;

decoder means for receiving the time-multiplexed station address from said link controller during the entire operating period and outputting an enabling signal during the address valid periods of said operating periods responsive to a station address corresponding to said station, the output of said decoder means being applied to said second station controller;

demultiplexer means associated with the first station controller for receiving the output of said decoder means during said operating period and for storing the output of said decoder means during the first address valid period of the operating period and continuously presenting said output to said first station controller; and switch means for simultaneously clocking the output of said decoder means into said second station controller and the output of said demultiplexer means into said first station controller such that both station controllers of said station operate in parallel to selectively connect said station to one of eight audio links.

* * * * *